(12) United States Patent
Stokes, III et al.

(10) Patent No.: US 10,938,840 B2
(45) Date of Patent: Mar. 2, 2021

(54) NEURAL NETWORK ARCHITECTURES EMPLOYING INTERRELATEDNESS

(71) Applicant: MICROSOFT TECHNOLOGY LICENSING, LLC, Redmond, WA (US)

(72) Inventors: Jack Wilson Stokes, III, North Bend, WA (US); Rakshit Agrawal, Mountain View, CA (US); Karthik Selvaraj, Kirkland, WA (US); Adrian M. Marinescu, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 16/160,540

(22) Filed: Oct. 15, 2018

(65) Prior Publication Data

US 2020/0120110 A1 Apr. 16, 2020

(51) Int. Cl.
*G06F 21/00* (2013.01)
*H04L 29/06* (2006.01)
(Continued)

(52) U.S. Cl.
CPC ........... *H04L 63/1416* (2013.01); *G06N 3/04* (2013.01); *G06N 3/08* (2013.01)

(58) Field of Classification Search
CPC ............. H04L 63/1416; H04L 63/1408; H04L 63/1425; H04L 63/1433; H04L 63/145;
(Continued)

(56) References Cited

U.S. PATENT DOCUMENTS

| 2017/0293804 A1* | 10/2017 | Min ..................... G06K 9/6274 |
| 2018/0053088 A1* | 2/2018 | Chakraborty ......... G06F 21/577 |
| 2018/0356151 A1* | 12/2018 | Suraganda Narayana ................... F25J 1/0022 |

OTHER PUBLICATIONS

Bahdanau, et al., "Neural Machine Translation by Jointly Learning to Align and Translate", In Journal of Computing Research Repository, Sep. 1, 2014, 15 Pages.
(Continued)

*Primary Examiner* — Ghazal B Shehni
(74) *Attorney, Agent, or Firm* — Shook, Hardy & Bacon L.L.P.

(57) ABSTRACT

Enhanced neural network architectures that enable the determination and employment of association-based or attention-based "interrelatedness" of various portions of the input data are provided. A method of employing an architecture includes receiving a first input data element, a second input element, and a third input element. A first interrelated metric that indicates a degree of interrelatedness between the first input data element and the second input data element is determined. A second interrelated metric is determined. The second interrelated metric indicates a degree of interrelatedness between the first input data element and the third input data element. An interrelated vector is generated based on the first interrelated metric and the second interrelated metric. The neural network is employed to generate an output vector that corresponds to the first input vector and is based on a combination of the first input vector and the interrelated vector.

17 Claims, 13 Drawing Sheets

(51) Int. Cl.
*G06N 3/04* (2006.01)
*G06N 3/08* (2006.01)

(58) Field of Classification Search
CPC ............... H04L 41/145; H04L 63/1441; H04L 63/0227; H04L 63/0428; H04L 63/10
See application file for complete search history.

(56) References Cited

OTHER PUBLICATIONS

Cho, et al., "Learning Phrase Representations using RNN Encoder-Decoder for Statistical Machine Translation", In Journal of Computing Research Repository, Jun. 3, 2014, 14 Pages.

Gers, et al., "Learning to Forget: Continual Prediction with LSTM", In Ninth International Conference on Artificial Neural Networks, Sep. 7, 1999, 7 Pages.

Hochreiter, et al., "Long Short-Term Memory", In Journal of Neural Computation, vol. 9, Issue 8, Nov. 15, 1997, pp. 1-32.

Luong, "Effective Approaches to Attention based Neural Machine Translation", In Journal of Computing Research Repository, Aug. 17, 2015, 11 Pages.

"International Search Report and Written Opinion Issued in PCT Application No. PCT/US2019/054672", dated Jan. 27, 2020, 28 Pages.

Wang, et al., "Intra-Image Region Context for Image Captioning", In Proceedings of Pacific Rim Conference on Multimedia, Sep. 21, 2018, pp. 212-222.

* cited by examiner

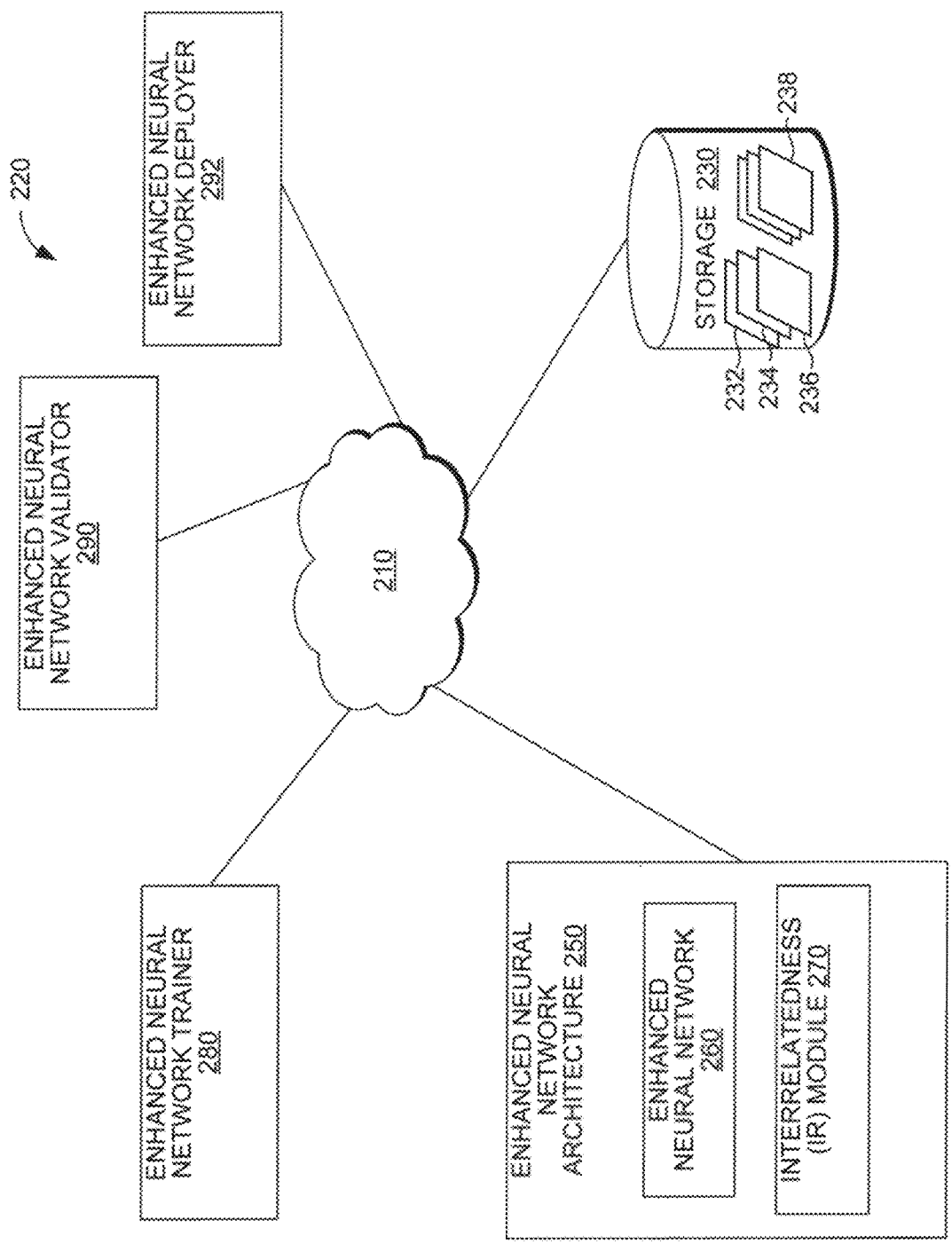

NEURAL NETWORK ARCHITECTURES EMPLOYING INTERRELATEDNESS

BACKGROUND

Advances in deep learning have enabled the application of neural networks to increasingly diverse domains of machine learning, such as computer vision, natural language processing (NLP), and computer/network security. The input data utilized by a neural network is typically embedded in a vector, which is provided to the first (or input) layer in the neural network architecture. Each input vector generates activation values, which propagate through the hidden layers of the network via the connection weights and activation functions of the neurons of the network. Through the propagation of the activation values, an output vector is generated at the final (or output) layer in the network. The output then may be used to make a decision or determination such as recognizing a shape in computer vision or a word in NLP.

In many applications, an element in the input data may be related and/or connected (to varying degrees) to at least another input data element. Such interrelatedness of the input data may provide useful information; for example, when analyzing a particular word in a sentence, some of the other words in the sentence are more related to the particular word, and are thus more informative when determining the semantic context of the particular word. Similarly, when analyzing a portion of an input image, some other portions of the image provide more contextual information than others. By utilizing this interrelatedness, computerized applications of machine learning may be made more accurate. However, conventional neural network architectures may not be capable of utilizing this interrelatedness to provide such benefits.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of this disclosure relate to computerized systems for enhanced neural network architectures that enable the determination and employment of the "interrelatedness" (or "interconnectedness") of various portions of the input data. The input data to an enhanced neural network may include a plurality of data elements, e.g., a plurality of input vectors. The data elements may be sequential or non-sequential. Whether sequential or non-sequential, some of the input data elements are more or less related and/or connected to other input data elements. For the input data elements, the various embodiments determine a degree of interrelatedness and/or interconnectedness between the various input data elements, and employ such interrelatedness and/or interconnectedness information to enhance the training and performance of a neural network.

In one non-limiting embodiment, the architecture of a neural network is configured and/or adapted to include an interrelatedness (IR) module. For each element of input data, the IR module is enabled to determine an interrelatedness or interconnectedness to at least a portion of the other input data element, via interrelated metrics. That is, the IR module generates information (or knowledge) regarding the interrelatedness of the input data. In addition to providing an IR module, the various embodiments are directed towards further configuring and/or adapting the architecture of a neural network, such as but not limited to a recurrent neural network (RNN), long short-term memory (LSTM) neural network, or convolutional neural network (CNN), to employ the interrelatedness information generated via the IR module. As discussed throughout, in some embodiments, the interrelatedness between input data elements is based on an association or similarity measure. In other embodiments, the interrelatedness between input data elements is based on an attention.

In one example embodiment, a computerized method includes receiving a first input data element, a second input data element, and a third input data element for a neural network. In some embodiments, each of the first, second, and third input data elements may be encoded in a corresponding input vector. The method further includes determining a first interrelated (or interconnected) metric that indicates a degree of interrelatedness (or interconnectedness) between the first input data element (or first input vector) and the second input data element (or second input vector). A second interrelated metric is determined. The second interrelated metric indicates a degree of interrelatedness between the first input data element and the third input data element (or third input vector). An interrelated vector is generated based on the first interrelated metric and the second interrelated metric. For example, the IR module may generate the interrelated vector based on the second and third input vectors. In at least one non-limiting embodiment, the interrelatedness module may be further based on the first input vector. The neural network may be employed to generate an output vector that corresponds to the first input vector. Generating the output vector is based on a combination of the first input vector and the interrelated vector.

As noted above, in some embodiments, the degree of interrelatedness between the input vectors is based on an association and/or similarity measure. For example, the association and/or similarity measure may include a cosine similarity operation (e.g., a dot product between vectors). A cosine similarity operation on two vectors (within the same vector space) measures the angle between the two vectors in the vector space. As such, an association and/or similarity measure on two input vectors may measure a degree of "closeness" between the two vectors. In such embodiments, determining the first interrelated metric may be based on a first cosine similarity operation on the first and the second input vectors. Determining the second interrelated metric may be based on a second cosine similarity operation on the first and the third input vectors. In other association embodiments, the association and/or similarity measure may include a pointwise mutual information (PMI) operation of the vectors. A PMI operation on two vectors quantifies the discrepancy between the probability of their coincidence.

In other embodiments, the degree of interrelatedness between the input vectors is based on an attention measure. In such embodiments, determining the first interrelated metric is based on a first attention operation on the second input vector. Determining the second interrelated metric is based on a second attention operation on the third input vector. For example, the first and second input vectors may be processed by a dense (or fully-connected) layer in a neural network that is trained to generate and/or process attention vectors.

In some embodiments, a first matrix is generated based on the second and third input vectors. The first matrix may be an interrelated matrix that includes the second and third input vectors as column vectors. A second matrix may be generated based on a first matrix operation on the first matrix. The first matrix operation determines the first and second interrelated metrics. The second matrix may include the first and second interrelated metrics, encoded as separate column vectors. The interrelated vector may be generated based on a second matrix operation on the second matrix.

In various embodiments, the enhanced neural network may be a neural network that includes a feedback mechanism, such as but not limited to an RNN or an LSTM. Such a feedback neural network is enabled to sequentially process sequential input data. The sequence of such sequential input data may include the first input vector, the second input vector, and the third input vector. The feedback-based neural network may be employed to generate a first output vector that corresponds to the first input vector. The neural network is further employed to generate a second output vector that corresponds to the second input vector. The generation of the second output vector is also based on the first output vector. The generation of the second output vector may be further based on a combination of the second input vector and a second interrelated vector. The second interrelated vector indicates a degree of interrelatedness between the second input vector and the third input vector. The generation of the third output vector may be further based on the second output vector that corresponds to the second input vector.

In various embodiments, the first, second, and third input vectors sequentially encode a plurality of sequential computing device operations. The neural network may be enabled to identify a computer security event. The computer security event is associated with the plurality of sequential computing device operations. Identifying the computer security event is based on the neural network sequentially generating a plurality of output vectors associated with the first, second, and third input vectors. For example, an enhanced neural network may be a classifier that is enabled to classify the input data as being associated with "malware," "ransomware," or "benign." In other embodiments, the neural network is a convolutional neural network (CNN) or other "deep" image processing neural network. In such embodiments, the first input vector encodes a first portion of an image, the second input vector encodes a second portion of the image, and the third input vector encodes a third portion of the image.

BRIEF DESCRIPTION OF THE DRAWINGS

Aspects of the disclosure are described in detail below with reference to the attached drawing figures, wherein:

FIG. 2B provides a block diagram showing aspects of an example computing system architecture suitable for implementing embodiments of the disclosure;

DETAILED DESCRIPTION

Figure 1A:
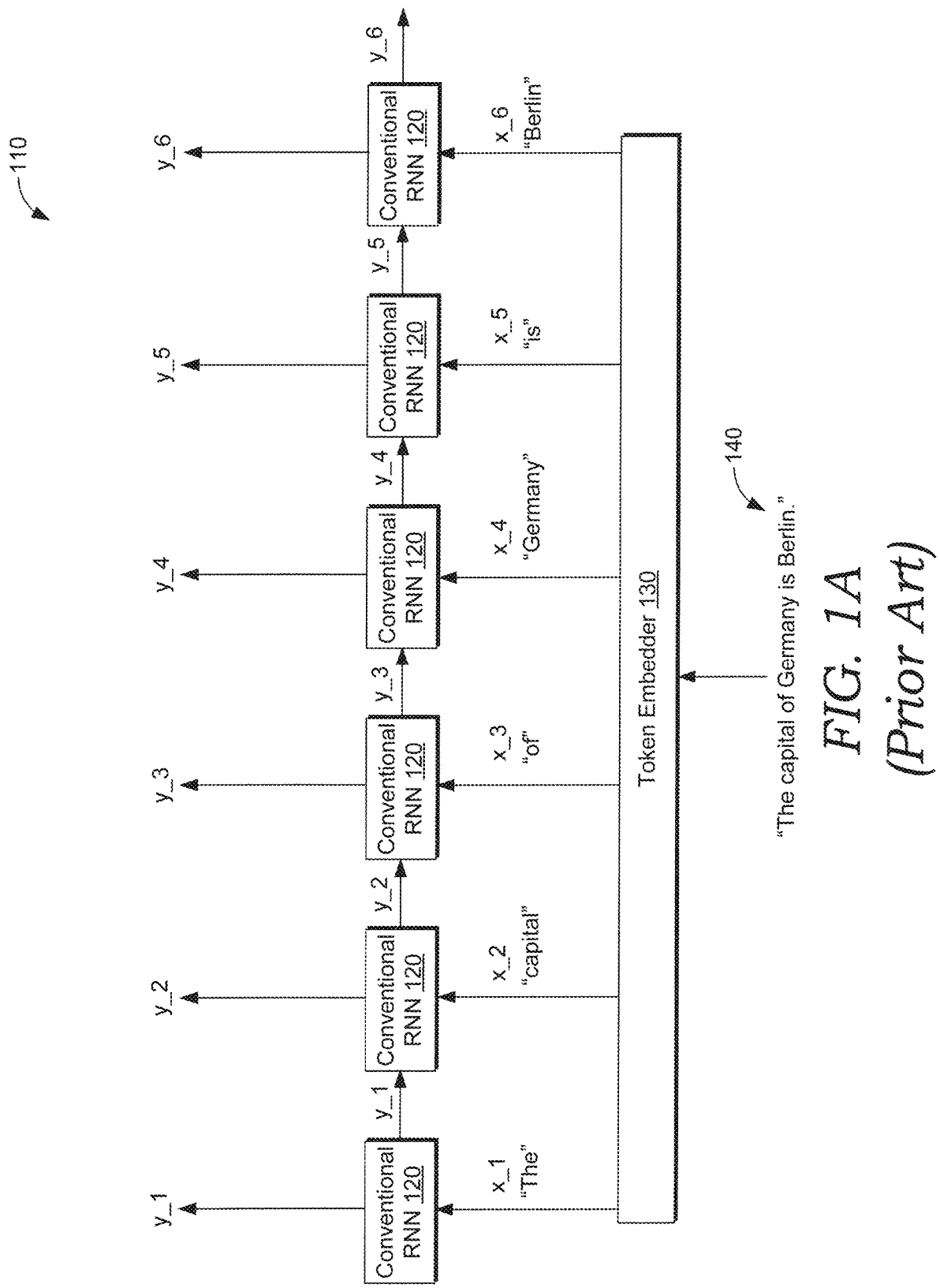
FIG. 1A shows a conventional sequence of steps for employing a conventional neural network to analyze sequential input data.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. As used herein, the term "set" may be employed to refer to an ordered (i.e., sequential) or an unordered (i.e., non-sequential) collection of objects (or elements), such as but not limited to data elements (e.g., input vectors, output vectors, matrices, data structures, and the like). A set may include N elements, where N is any non-negative integer. That is, a set may include 0, 1, 2, 3, . . . objects and/or elements. Therefore, as used herein, a set may be a null set (i.e., an empty set), or a set with only a single element. In other embodiments, a set may include a number of elements that is significantly greater than one, two, or three elements.

Briefly, the various embodiments herein are directed towards enhanced neural network architectures and the applications thereof that enable the determination and employment of the "interrelatedness" (or "interconnectedness") of various portions of the input data. As discussed throughout, conventional neural networks may not determine and employ the interrelatedness between the portions of the input data. In many applications, the input data for a neural network is highly interrelated. That is, a first portion of the input data is interrelated and/or interconnected to a second portion of the input data. This interrelatedness provided may be employed to generate "latent" or "hidden" patterns in the input data. In general, neural networks "learn" patterns in the input data and employ those patterns to generate probabilistic output, such as predictions, classifications, encodings, decodings, and the like. The enhanced neural networks discussed herein generate output that is based on the interrelated patterns associated with the input data. Because conventional neural networks do not consider such interrelated information and/or patterns in the input data, the enhanced neural network architectures herein outperform conventional neural networks, at least in that the enhanced neural networks herein generate predictions, classifications, encodings, and decodings that are more accurate and precise than those associated with conventional neural networks. As an example, FIGS. 8A and 8B demonstrate that the enhanced neural networks herein enable a larger true positive rate for a given false positive rate, as compared to the conventional models.

Advances in deep learning have enabled the application of neural networks to increasingly diverse domains of machine learning, such as computer vision, natural language processing (NLP), and computer/network security (e.g., detection of malware and/or ransomware). In many applications, large volumes of high-quality curated and/or annotated (i.e., labeled) training data are employed to "train" a neural network, which may include numerous "deep" and/or "hidden" layers connected via a plurality of weights. During training, a neural network analyzes the training data and compares the results of the analyses to the training data's labels. The weights connecting the layers are iteratively adjusted, via backpropagation and gradient descent, until the comparison of the analyses and the labels converge.

For example, in classifier applications, a particular piece of training data may belong to a particular classification or category of data. The label for the particular piece of training data may indicate the particular classification and/or category (i.e., the "ground-truth") for the particular piece of training data. The neural network is trained until the weights between the layers have converged, such that the analyses can determine, to within a desired degree of reliability and/or accuracy, the appropriate classification for at least a large portion of the training data. Upon convergence, the trained neural network may be validated via validation data, i.e., labeled data that was not employed during the training of the neural network.

Some types of neural networks, such as recurrent neural networks (RNNs) and long short-term memory (LSTM) neural networks, are suited towards the analysis of sequential input data, such as natural language sentences and sequences of machine-executed actions or events. Other types of neural networks, such as convolutional neural networks (CNNs), are suited towards the analysis of two-dimensional (2D) or higher dimensional input data, such as image data. During training of these, as well as other types of neural networks, the networks "learn" to, via the iterative adjustment of the network's weights, identify features and/or structures within the input training data. The features and/or structures, which may be "hidden" or "latent," are encoded in an output vector of the neural network. The output vector may be analyzed (e.g., decoded) to detect objects depicted in input image data, determine the semantic meaning of an input natural language sentence, or identify a corresponding category/classification of the input data. In at least one embodiment, a one-dimensional (1D) CNN is employed to process sequential input data.

The input data is typically embedded in vectors, which are provided to the first (or input) layer in the network. Each input vector generates activation values, which propagate through the hidden layers of the network via the connection weights and activation functions of the neurons of the network. Through the propagation of the activation values, an output vector is generated at the final (or output) layer in the network. In many applications, each element in the input data is related and/or connected (to varying degrees) to at least some of the other input data elements. Such interrelatedness of the input data provides useful information when analyzing the input data. For example, when analyzing a particular word in a sentence, some of the other words in the sentence are more related to the particular word, and are thus more informative when determining the semantic context of the particular word. Similarly, when analyzing a portion of an input image, some other portions of the image provide more contextual information than others. Conventional neural network architectures may not be enabled to identify and/or exploit the interrelatedness of the input data.

In general, input data for a neural network may include a plurality of data elements, e.g., a plurality of input vectors. The data elements may be sequential (e.g., a sequence of natural language words or machine-executable actions or events) or non-sequential (e.g., image data). Whether sequential or non-sequential, some of the input data elements are more or less related and/or connected to other input data elements. That is, the interrelatedness and/or interconnectedness between the input data elements varies. For the input data elements, the various embodiments determine a degree of interrelatedness and/or interconnectedness between the various input data elements and employ such interrelatedness and/or interconnectedness information to enhance the training and performance of a neural network.

In one non-limiting embodiment, the architecture of a neural network is configured and/or adapted to include an interrelatedness (IR) module. For each element of input data, the IR module is enabled to determine an interrelatedness or interconnectedness to at least a portion of the other input data elements, via interrelated metrics. That is, the IR module generates information (or knowledge) regarding the interrelatedness of the input data. As discussed throughout, an enhanced neural network that employs this interrelatedness information generally outperforms and is more readily trainable than a conventional neural network that does not determine, nor employ, such knowledge of the input data. In addition to providing an IR module, the various embodiments are directed towards further configuring and/or adapting the architecture of a neural network, such as but not limited to a recurrent neural network (RNN) or a convolutional neural network (CNN), to employ the interrelatedness information generated via the IR module. The performance of such an enhanced neural network is increased, as compared to a conventional neural network. Furthermore, the amount of training time and/or training examples required to train an enhanced neural network may be decreased, as compared to conventional neural networks.

In some embodiments, the interrelatedness knowledge of a particular input data element is based on an "association" or "similarity measure" to the particular input data element's neighboring input data elements. That is, in these embodiments, the degree of interrelatedness between the neighboring input vectors is based on an association and/or similarity measure. For example, the association and/or similarity measure may include a cosine similarity operation (e.g., a dot product between vectors). A cosine similarity operation on two vectors (within the same vector space) measures the angle between the two vectors in the vector space. As such, an association and/or similarity measure on two input vectors may measure a degree of "closeness" between the two vectors. Thus, in these embodiments, the IR module may determine the association of an input data element to its neighboring input data elements, via an "association vector." In other association embodiments, the association and/or similarity measure may include a pointwise mutual information (PMI) operation of the vectors. A PMI operation on two vectors quantifies the discrepancy between the probability of their coincidence. In still other embodiments, the interrelatedness knowledge of the particular input data element is based on a determination of an "attention" to the neighboring input data elements, e.g., sequential input data recently considered. In these attention embodiments, the IR module may determine the attention of an input data element to its neighboring data elements, via an "attention vector."

Whether the input data is sequential or non-sequential, when processing a current input data element, an enhanced neural network combines the current input data element with interrelatedness information associated with the current input data element. The interrelatedness information associated with the current input data element includes a degree of interrelatedness and/or in interconnectedness to at least input data elements that are "nearby" or "neighboring" the current input data element. In a non-limiting example, when a CNN is analyzing and/or processing a first portion of an image, the CNN may employ information generated via the IR module that indicates the interrelatedness between the first portion and other (e.g., neighboring) portions of the image. In another non-limiting example that is directed towards natural language processing (NLP), an RNN may sequentially analyze a sequence of natural language or tokens, e.g., "The capital of Germany is Berlin." A comparison of FIGS. 1A and 1B demonstrates the contrast between conventional methods of employing a conventional RNN (FIG. 1A) to analyze the above sentence and employing enhanced embodiments (FIG. 1B) discussed herein to analyze the above sentence.

Figure 1B:
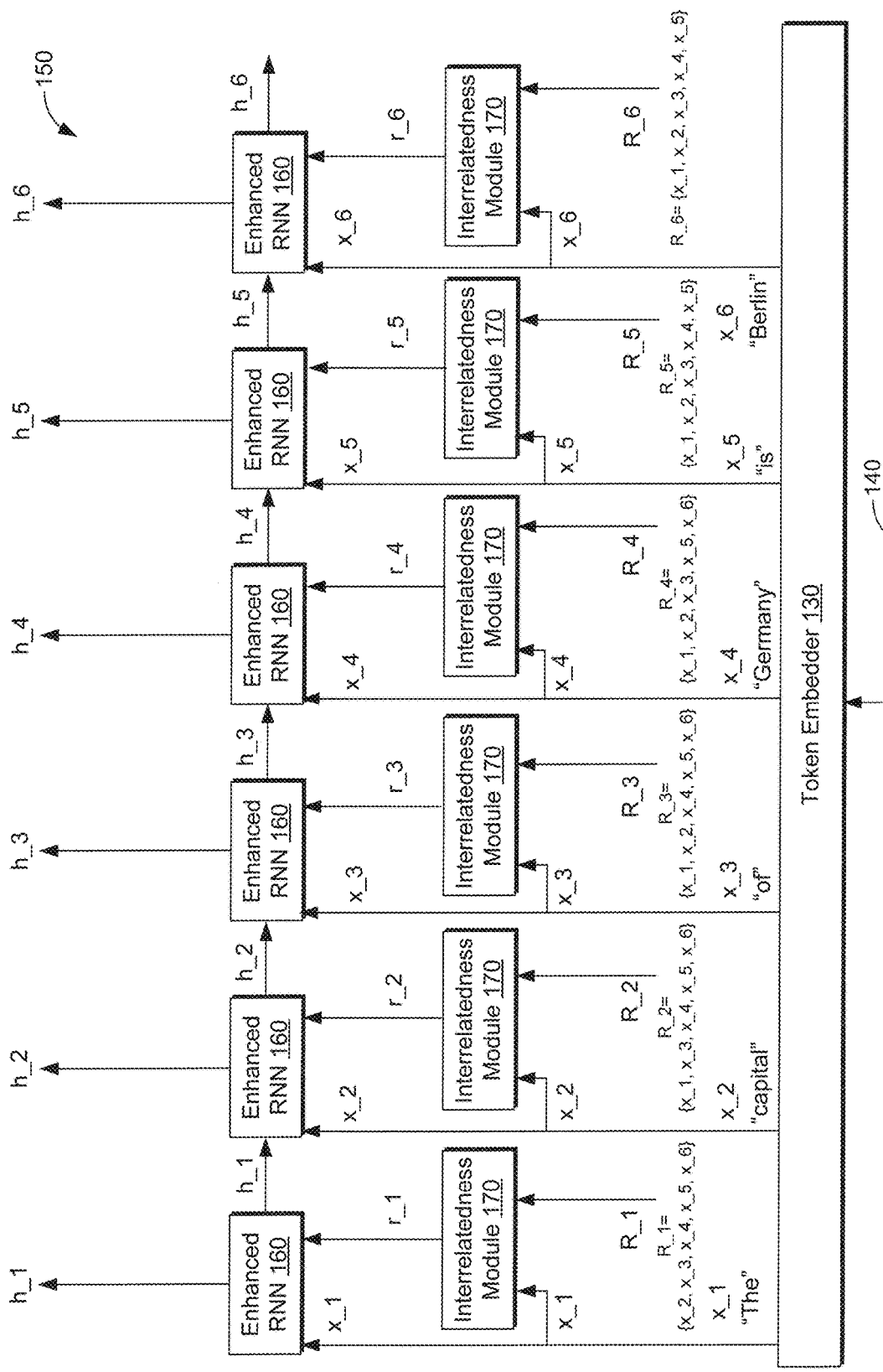
FIG. 1B shows an enhanced sequence of steps for employing an enhanced neural network architecture to analyze the sequential input data of FIG. 1A.

FIG. 1A shows a conventional sequence of steps 110 for employing a conventional neural network 120 to analyze sequential input data 140. In contrast, FIG. 1B shows an enhanced sequence of steps 150 for employing an enhanced neural network 160 to analyze the sequential input data 140 of FIG. 1A. More particularly, in FIG. 1A, via conventional steps 110, a conventional RNN 120 is shown sequentially analyzing the sentence 140 "The capital of Germany is Berlin." In contrast to FIG. 1A, the enhanced steps 150 of FIG. 1B illustrate an enhanced neural network architecture that includes enhanced RNN 160 and an interrelatedness (IR) module 170. Via enhanced steps 150, the enhanced neural network architecture of FIG. 1B sequentially analyzes the sentence 140 "The capital of Germany is Berlin." In both FIGS. 1A and 1B, a token (and/or word) embedder 130 generates a vector embedding for each word (or token) included in the sentence 140. As shown in FIGS. 1A and 1B, $x_1$ represents the vector embedding for the token (or word) "The," $x_2$ represents the vector embedding for the token "capital," $x_3$ represents the vector embedding for the token "of," $x_4$ represents the vector embedding for the token "Germany," $x_5$ represents the vector embedding for the token "is," and $x_6$ represents the vector embedding for the token "Berlin." Note the slight difference in nomenclature between FIGS. 1A and 1B (e.g., x_1 and $x_1$). Either notation is used throughout interchangeably. In this non-limiting example, the input data elements include $x_i$ (or x_i), where i=1, 2, 3, 4, 5, 6 may be interchangeably referred to as input vectors and/or input signals.

In FIG. 1A, conventional RNN 120 initially processes (or analyzes) x_1 (i.e., initial input data element) to generate an initial (or first) output data element (or output signal or vector) y_1. Initial output signal y_1 is therefore based on x_1 and not any of x_2, x_3, x_4, x_5, nor x_6. Initial output signal y_1 is employed as a feedback impulse (or signal) into conventional RNN 120. y_1 may be stored in a memory cell of conventional RNN 120. For the next step in conventional steps 110, conventional RNN 120 processes input signal x_2 based on y_1 and generates output signal y_2. Thus, output signal y_2 is based on each of input signal x_2 and an output signal that is based on x_1 (i.e., output signal y_1). As shown in FIG. 1A, this conventional processing continues until the final input data element x_6 is processed to generate final output data element y_6. The final output data element (or signal) y_6 is based on x_6, as well as output data element y_5. Note that output y_5 is based on input x_5 and y_4. Thus, FIG. 1A shows the conventional sequential processing of sentence 140.

Note that at least some of the input data elements are significantly related, interconnected, correlated, and/or interdependent. For example, input data elements x_4 ("Germany") and x_6 ("Berlin") are significantly interrelated and/or interconnected. If x_4 were the vector embedding of "England" rather than "Germany," then x_6 would most likely be the vector embedding of "London" rather than "Berlin." Also note that x_6 is interrelated, to a lesser degree, to the other input data elements x_1-$x$_4. As shown in FIG. 1A, conventional steps 110 do not determine and/or employ information regarding such interrelatedness of the input data elements.

In contrast to convention steps 110, enhanced steps 150 of FIG. 1B do incorporate such interrelatedness information of input data elements when processing the input data elements. The enhanced neural network architecture of FIG. 1B includes an interrelatedness (IR) module 170 and an enhanced RNN 160. Similar to conventional steps 110 of FIG. 1A, enhanced steps sequentially process input data elements x_1-$x$_6. Similar to conventional RNN 120, when processing each input element, enhanced RNN 160 generates an output vector, signal, or data element (e.g., h_1-$h$_6) that is used as a feedback impulse for the processing of the next input data element. For example, the processing of input data element x_5 generates the output data element h_5. The processing of x_6 is based on h_5 and x_6. It is noted that in conjunction with at least FIG. 1B, at least some of the input data elements (x_1-$x$_6) may be output vectors from previous, upstream, and/or lower-level layers of the neural network. For example, any these input vectors may have been generated by another layer of the neural network, such as but not limited to a dense layer.

However, in contrast to the conventional processing of FIG. 1A, at each of the enhanced processing steps 150, the IR module 170 generates an interrelated data element (or interrelated vectors), e.g., r_1-$r$_6. FIG. 1B shows the sequential generation, via IR module 170, of r_1-$r$_6. More specifically, to generate interrelated data element r_i (where i is an integer between 1 and 6), IR module 170 receives x_i and a "neighboring" element (or signal), that includes the input data element vector embeddings that are "neighboring" or near x_i, i.e., R_i. As shown in the non-limiting embodiment of FIG. 1B, R_1={x_2, x_3, x_4, x_5, x_6}, R_2={x_1, x_3, x_4, x_5, x_6}, R_3={x_1, x_2, x_4, x_5, x_6}, R_4={x_1, x_2, x_3, x_5, x_6}, R_5={x_1, x_2, x_3, x_4, x_6}, and R_6={x_1, x_2, x_3, x_4, x_5}. In another embodiment, the "neighboring" input data element only includes the previously processed neighboring input data elements. That is, in some embodiments, R_1={ }, R_2={x_1}, R_3={x_1, x_2}, R_4=(x_1, x_2, x_3), R_5={x_1, x_2, x_3, x_4}, and R_6={x_1, x_2, x_3, x_4, x_5}.

Various embodiments of an IR module, such as but not limited to IR module 170, are discussed in conjunction with at least FIGS. 2B-3C. However, briefly here, IR module 170 generates the corresponding interrelated data element (e.g., r_i) based on the particular input data element (e.g., x_i) and the other input elements (R_i) that are neighboring the particular input elements. Note that each of x_i and r_i may be encoded in a vector of dimensionality n, where n is a positive integer. Thus, R_i may be encoded in a (n×L) matrix, where L is a positive integer that indicates the number of neighboring input data elements.

In some embodiments, IR module generates 170 an interrelated data element (r_i) that is based on an association and/or similarity measure (e.g., cosine similarity) between the particular input data element (x_i) and each of its neighboring data elements, as encoded via R_i. As an example, and as mentioned above, x_4 and x_6 are more similar than x_6 and x_5. Upon being generated via IR module 170, r_6 indicates that x_6 is more similar to x_4 than to x_5. When processing x_6, enhanced RNN 160 associates x_4 to x_6 to a greater degree than x_5 to x_6. In other embodiments, the interrelated data element is based on an attention distributed across the neighboring input data elements. In these embodiments, r_6 would indicate the distribution of attention that enhanced RNN 160 considers when processing x_6.

As shown in FIG. 1B (and in contrast to FIG. 1A), an interrelatedness data element is generated and employed for each corresponding input data element. In additional to being based on the current input data element and the previous output data element, the processing of the current input data element in enhanced steps 150 of FIG. 1B is further based on the corresponding interrelated data element (or interrelated vector) (r_1-r_6). For each input data element (x_1-x_6), IR module 170 generates a corresponding interrelated data element (r_1-r_6), that is in turn, each based on a signal representing the "neighboring" input elements (R_1-R_6). The enhanced RNN 160 receives the corresponding interrelated data element and processes the current input data element based on the previous output data element and the corresponding interrelated data element. As a non-limiting example, the processing of x_6 is based on output h_5 (i.e., the output of processing for x_5) and corresponding interrelated data element r_6, where r_6 encodes an interrelatedness metric to the other input data elements that are "neighboring" x_6. Various embodiments of an enhanced RNN, such as but not limited to enhanced RNN 160 generating an output data element (h_i) based on each of an input data element (x_i) and an interrelated data element (r_i), are discussed throughout.

It should be understood that the enhanced process of FIG. 1B may be generalized to types of neural networks other than RNNs. For example, the enhanced steps 150 may be generalized to other types of recurrent and/or recursive neural networks, such as but not limited to bidirectional RNNs, recursive RNNs, gated recurrent units (GRUs), long short-term memory (LSTM) neural networks, and the like. Furthermore, the enhanced process of FIG. 1B may be generalized to non-sequential input data and other forms of neural networks, such as but not limited to a convolutional neural network (CNN). For example, the interrelatedness and/or interconnectedness of portions of an image may be accounted for via an IR module and an enhanced convolutional neural network. In one non-limiting embodiment, the neighboring regions of each section of an image may be processed via an IR module. During the convolution of a particular section of an image, the enhanced CNN may receive the generated interrelated data element and incorporate the interrelated data element into the convolution of the particular section.

In some non-limiting embodiment that are directed towards computer and/or network security application, one or more classifier (such as but not limited to a binary classifier) enhanced neural networks are trained and employed to sequentially process sequential computer (or network) security data. The enhanced neural networks classify the data as either being associated with "ransomware" (or other types of "malware") or associated with "benign" computer operations. The input data includes sequences of executable events that are either events (or signals) generated by ransomware (or other malware such as but not limited to cryptocoin mining malware or side-channel attack malware) or events generated by benign applications. That is, the input data may be sequential signals generated by software applications that may be classified as "malware" or "benignware." By employing the enhanced neural network architecture that employs the interrelatedness of the input data as discussed throughout, the various embodiments may detect malware (such as but not limited to ransomware) earlier than conventional methods. The detected malware may be isolated, neutralized, or removed prior to causing damage to the infected computer and/or network system. In various embodiments, the detected malware may be cryptocoin (e.g., Bitcoin or other distributed-ledger type applications) mining malware or side-channel attack malware. To detect malware regarding side-channel attacks or cryptocoin mining, "hardware" counters (which may be the events in the sequenced input data) may be used in conjunction with "software" events in the processing. That is, either software events, hardware events, or a combination thereof, may be employed to detect malware. As noted throughout, such computer and/or network security application may be employed to distinguish between signals generated by "benign" software and signals generated by malware. Upon detection of such malware generated signals or events, the malware may be isolated, removed, or otherwise neutralized prior to harm to the computer and/or network system.

Figure 2A:
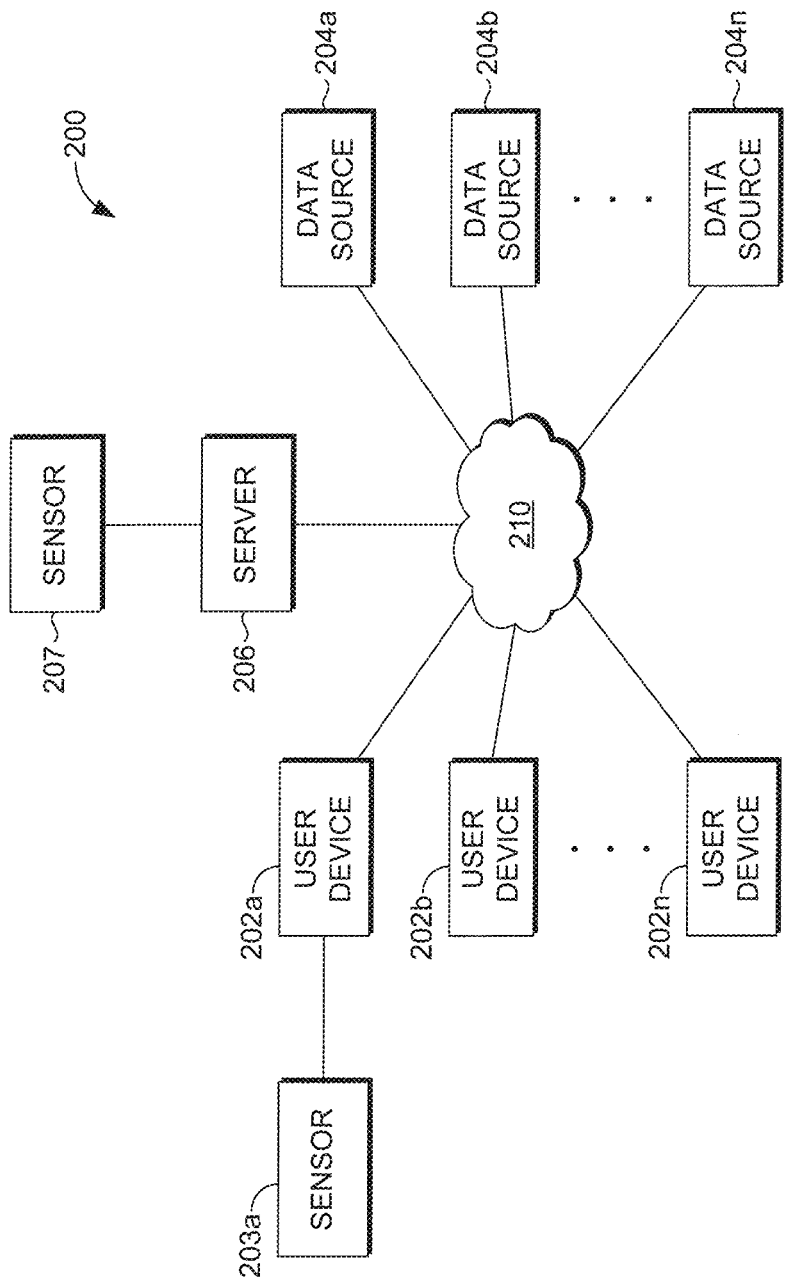
FIG. 2A provides a block diagram showing an example operating environment in which some embodiments of the present disclosure may be employed.

Turning now to FIG. 2A, a block diagram is provided showing an example operating environment 200 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 200 includes a number of user devices, such as user devices 202*a* and 202*b* through 202*n*; a number of data sources, such as data sources 204*a* and 204*b* through 204*n*; server 206; sensors 203*a* and 207; and network 220. It should be understood that environment 200 shown in FIG. 2A is an example of one suitable operating environment. Each of the components shown in FIG. 2A may be implemented via any type of computing device, such as computing device 600 described in connection to FIG. 6, for example. These components may communicate with each other via network 210, which may include, without limitation, a local area network (LAN) and/or a wide area network (WAN). In exemplary implementations, network 210 comprises the Internet and/or a cellular network, amongst any of a variety of possible public and/or private networks.

It should be understood that any number of user devices, servers, and data sources may be employed within operating environment 200 within the scope of the present disclosure. Each may comprise a single device or multiple devices cooperating in a distributed environment. For instance, server 206 may be provided via multiple devices arranged in a distributed environment that collectively provide the functionality described herein. Additionally, other components not shown may also be included within the distributed environment.

User devices 202*a* and 202*b* through 202*n* can be client devices on the client-side of operating environment 200, while server 206 can be on the server-side of operating environment 200. Server 206 can comprise server-side software designed to work in conjunction with client-side software on user devices 202*a* and 202*b* through 202*n* so as to implement any combination of the features and functionalities discussed in the present disclosure. This division of operating environment 200 is provided to illustrate one example of a suitable environment, and there is no requirement for each implementation that any combination of server 206 and user devices 202*a* and 202*b* through 202*n* remain as separate entities.

User devices 202*a* and 202*b* through 202*n* may comprise any type of computing device capable of use by a user. For example, in one embodiment, user devices 202*a* through 202*n* may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 204*a* and 204*b* through 204*n* may comprise data sources and/or data systems, which are configured to make data available to any of the various constituents of operating environment 200. (For instance, in one embodiment, data sources 204*a* through 204*n* provide (or make available for accessing) user data to user-data component 210 of FIG. 2A.) Data sources 204*a* and 204*b* through 204*n* may be discrete from user devices 202*a* and 202*b* through 202*n* and server 206 or may be incorporated and/or integrated into at least one of those components. In one embodiment, data sources 204*a* through 204*n* comprise sensors 203*a*, 207, which may be integrated into or associated with the user device(s) 202*a*, 202*b*, or 202*n* or server 206.

Operating environment 200 can be utilized to implement a component of the components of enhanced system 220, described in FIG. 2A, including components for automatically generating, validating, and deploying predictive models (PMs). Operating environment 200 also can be utilized for implementing aspects of process flows or methods 400, 500, 600, and 700 described in conjunction with FIGS. 3-7.

Referring now to FIG. 2B, in conjunction with FIGS. 1B-2A, a block diagram is provided showing aspects of an example computing system 220 architecture suitable for implementing an embodiment of the disclosure and designated generally as an enhanced system 220 for training, deploying, implementing, and using enhanced neural network architectures. Other arrangements and elements can be used in addition to or instead of those shown, and some elements may be omitted altogether for the sake of clarity. Further, as with operating environment 200 of FIG. 2A, many of the elements described herein are functional entities that may be implemented as discrete or distributed components or in conjunction with other components, and in any suitable combination and location.

The system 220 includes network 210, which is described in connection to FIG. 2A, and which communicatively couples components of system 220, including but not limited to storage 230, enhanced neural network architecture 260, enhanced neural network trainer 280, and enhanced neural network validator 290. System 200 enables the training, validation, and deployment of enhanced neural network architectures, such as but not limited to enhanced neural network architecture 250. Enhanced neural network trainer 280 is generally responsible for training enhanced neural network architecture 250. Enhanced neural network validator 290 is generally responsible for validating trained enhanced neural network architecture 250. Enhanced neural network deployer 292 is generally responsible for deploying trained and validated enhanced neural network architecture 250.

Enhanced neural network architecture 250 includes an enhanced neural network 260 and an interrelatedness (IR) module 270. Various embodiments of an IR module are discussed throughout. However, briefly here, IR module 270 is enabled to receive at least one of an input data element (e.g., $x\_i$) and/or a "neighboring" input data element (e.g., $R\_i$), where the neighboring input element includes input data elements that are "neighboring" $x\_i$. In response to receiving at least one of $x\_i$ and/or $R\_i$, IR module is enabled to generate an interrelated data element (e.g., $r\_i$). As discussed throughout, the interrelated data element may be based on at least one of an association (or similarity) metric between $x\_i$ and $R\_i$ or an attention metric associated with $R\_i$.

Figure 3A:
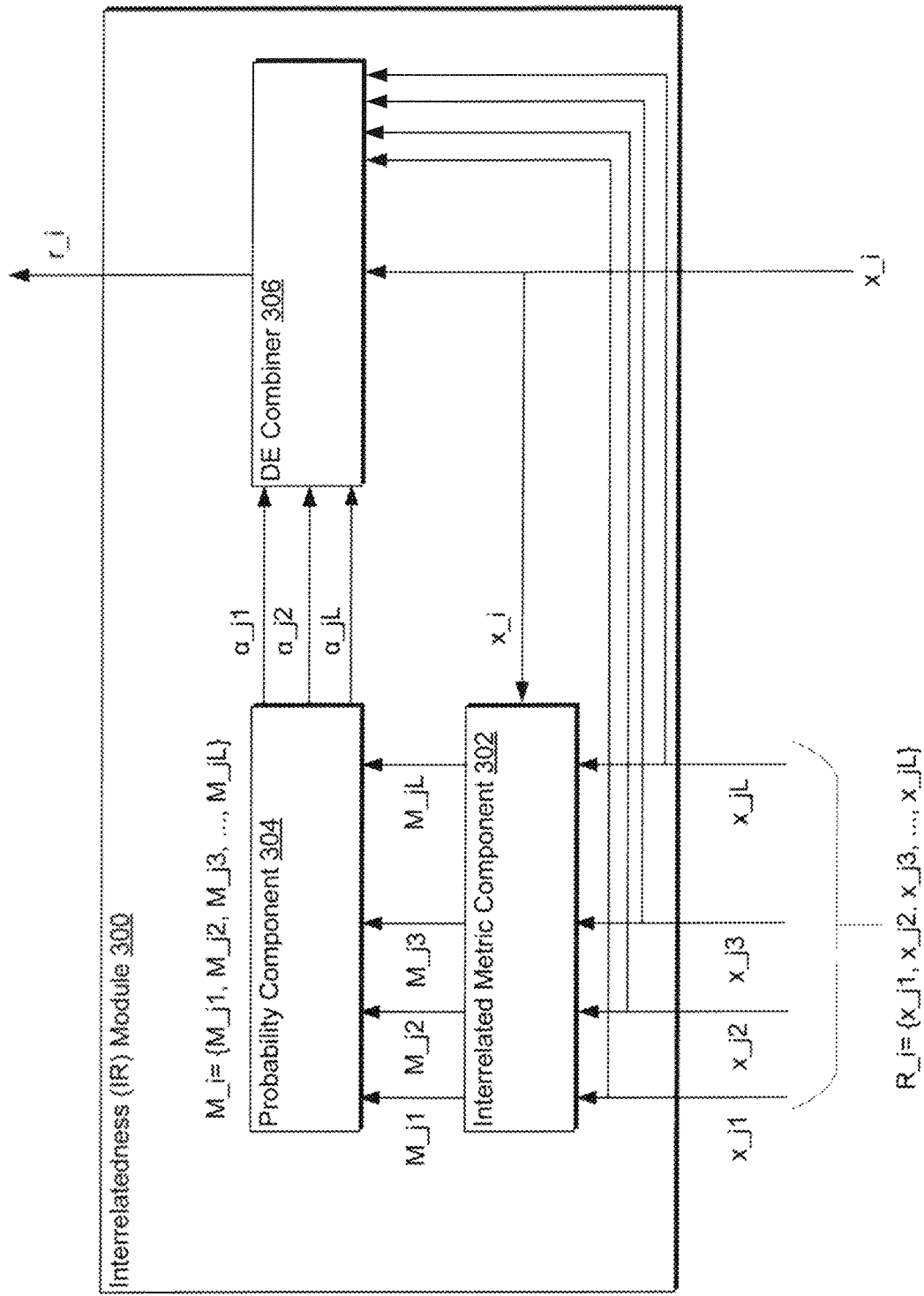
FIG. 3A is a block diagram illustrating an exemplary interrelatedness module in which some embodiments of the present disclosure may be employed.
Figure 3B:
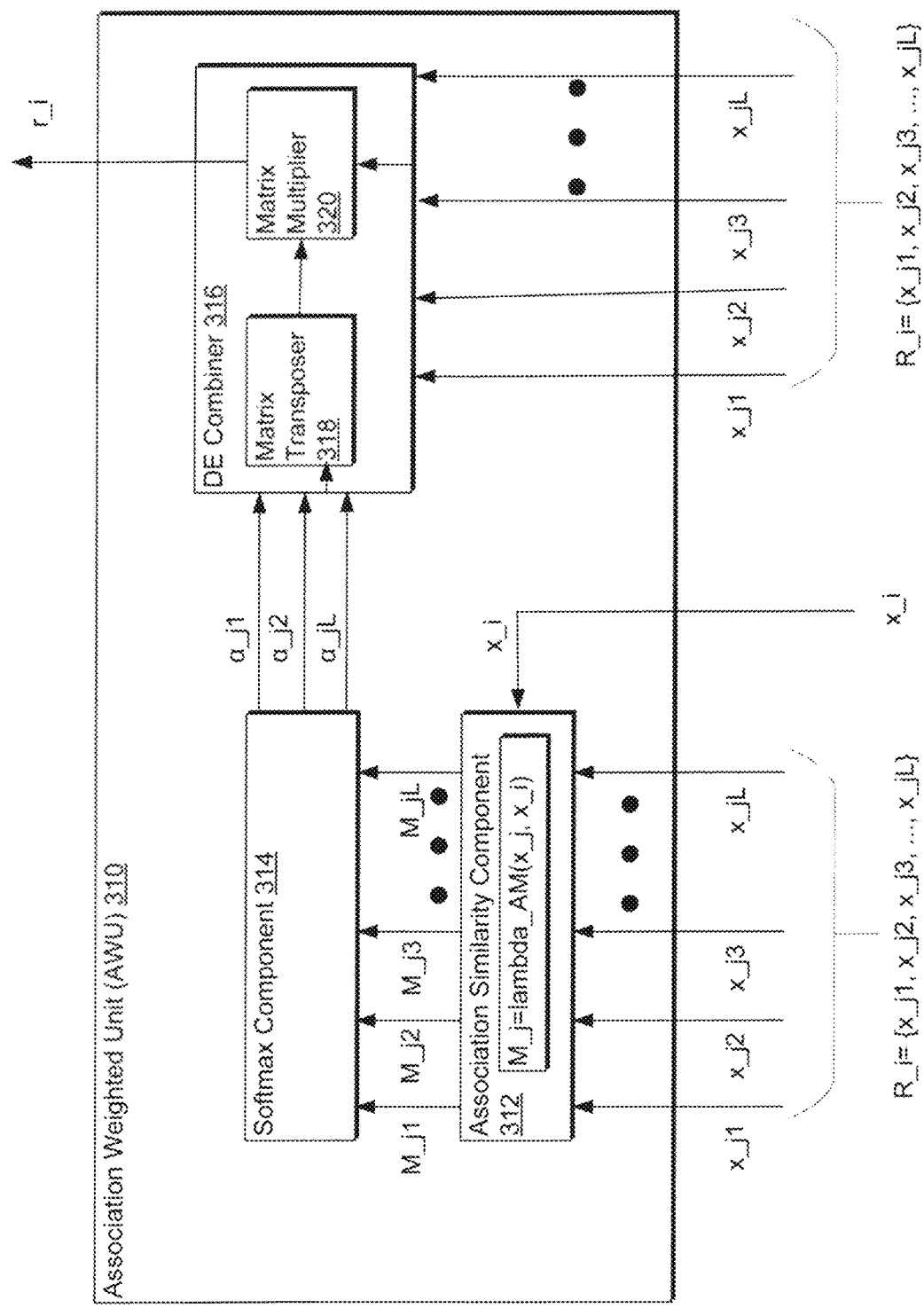
FIG. 3B provides a block diagram illustrating an association weighted unit in which some embodiments of the present disclosure may be employed.
Figure 3C:
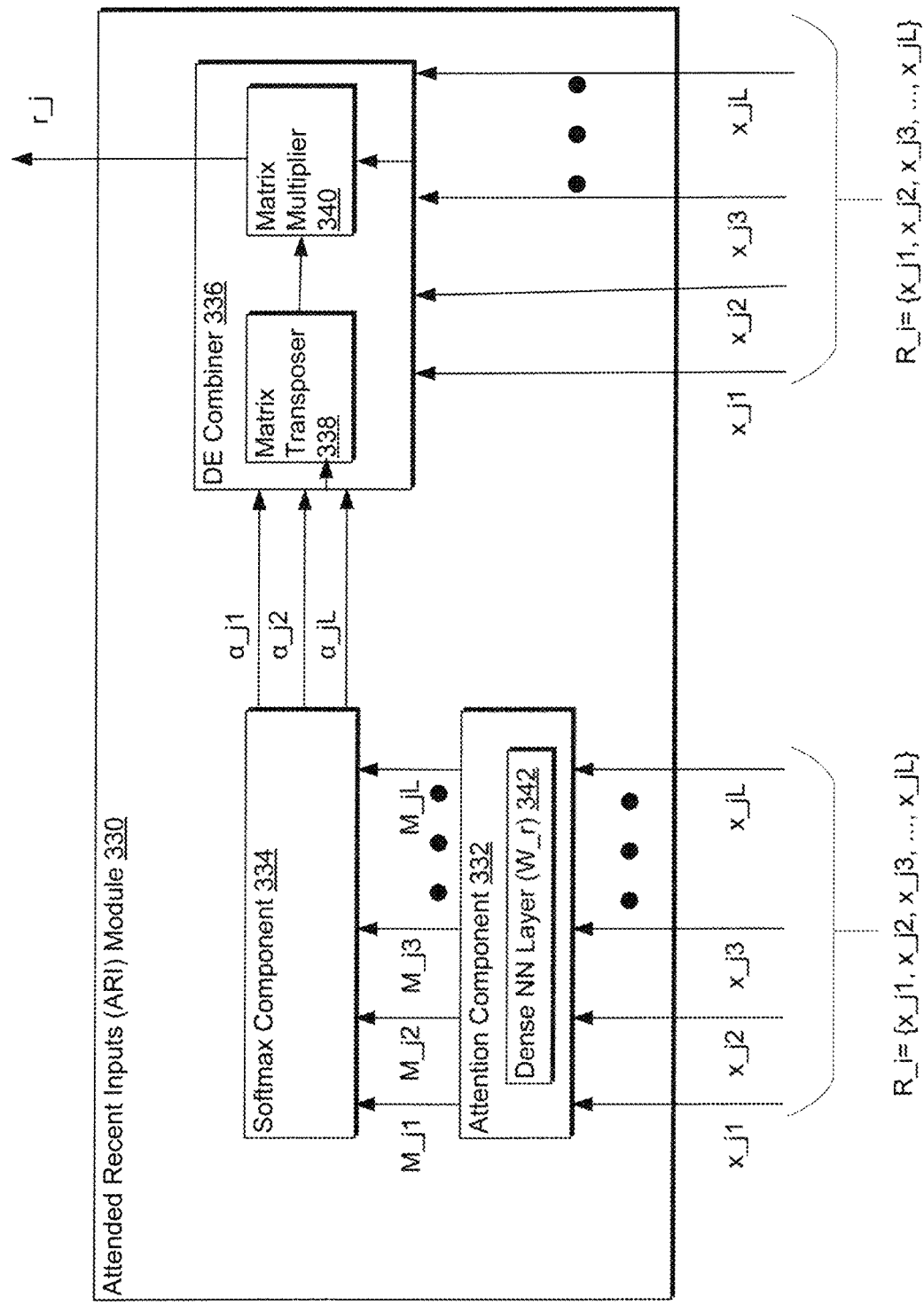
FIG. 3C provides a block diagram illustrating an attended recent inputs module in which some embodiments of the present disclosure may be employed.

IR module 270 may include similar features, components, and/or functionalities of the various IR modules discussed throughout, including but not limited to IR module 170 of FIG. 1B, IR module 300 of FIG. 3A, association weighted unit 310 of FIG. 3B, and/or attended recent inputs (ARI) module 330 of FIG. 3C. IR module 270 may be an association weighted unit (or module), such as but not limited to association weighted unit 310 of FIG. 3B. In other embodiments, IR module 270 may be an attended recent inputs (ARI) module, such as but not limited to ARI module 330 of FIG. 3C.

Various embodiments of an enhanced neural network 260 are discussed throughout. However, briefly here, enhanced neural network 260 is a neural network that is enabled to receive the input data element and the interrelated data element (generated via IR module 270) and generate an output data element (e.g., y_i) based on a combination of the input data element and the interrelated data element. That is, enhanced neural network 260 is a neural network that is adapted and/or arranged to generate a combination of x_i and r_i, and generate y_i, via various embodiments discussed herein. Enhanced neural network 260 may be a "deep" neural network with multiple "hidden" layers. In some embodiments, enhanced neural network 260 is enabled to receive and sequentially process sequential input data elements. However, other embodiments are not so limited and enhanced neural network 260 processes data that need not be sequential. That is, the input data elements may be sequential or non-sequential data elements. Enhanced neural network 260 may be, but is not limited to a recurrent neural network (RNN), a bidirectional RNN, a recursive RNN, a gated recurrent unit (GRU), a long short-term memory (LSTM) neural network, and/or another type of class of a neural network that includes a feedback mechanism. In other embodiments, enhanced neural network 260 may be a feed-forward neural network, such as but not limited to a convolutional and/or deconvolutional neural network. Enhanced neural network 260 may include more than one neural network. For example, enhanced neural network 260 may include an encoder-decoder configuration of multiple neural networks.

In various embodiments, enhanced neural network architecture 250 is configured and/or adapted to one or more applications, such as but not limited to computer/machine vision, object recognition, natural language processing (NLP), computer/network security (e.g., detection of malware and/or ransomware), and/or any other applications and/or domains where "deep learning" is applicable. In at least one embodiment, enhanced neural network architecture 250 is configured and/or adapted to function as a classifier, such as but not limited to a binary or a tertiary classifier. In other embodiments, enhanced neural network architecture 250 is configured and/or adapted to function as an object and/or subject identifier that identifies and/or recognizes objects, individuals, and other subjects depicted within image data. In some embodiments, enhanced neural network architecture 250 is configured and/or adapted to function as an image segmenter. In at least one embodiment, enhanced neural network architecture 250 is configured and/or adapted to function as a ransomware or other malware (such as but not limited to cryptocoin mining malware or side-channel attack malware) detector and/or identifier.

As noted above, enhanced neural network trainer 280 is generally responsible for training enhanced neural network architecture 250. Enhanced neural network trainer 280 may train enhanced neural network architecture 250 via various supervised or unsupervised methods based on training data 232 stored in storage 230. In one non-limiting embodiment, training data 232 includes annotated and/or curated (i.e., labeled) training data. Enhanced neural network trainer 280 may employ labeled training data 232 to train enhanced neural network architecture 250 via supervised methods. For example, in a non-limiting embodiment, enhanced neural network trainer 280 may employ backpropagation and gradient descent, as well as a loss function, to train enhanced neural network architecture 250. The loss function may be based on the labels included in training data 232 and output of the enhanced neural network architecture 250. In some embodiments, based on one or more activation functions, enhanced neural network trainer 280 is enabled to iteratively update weights of enhanced neural network 260 and IR module 270, such that the loss function is minimized, or at least decreased.

Upon convergence of the training, enhanced neural network validator 290 may validate trained enhanced neural network architecture 250 via validation data 234 stored in storage 230. Upon validation, the weights and/or activation functions of enhanced neural network architecture 250 may be stored in neural network models 236 included in storage 230. Enhanced neural network deployer 292 is enabled to deploy the trained and validated enhanced neural network architecture 250 into one or more applications, such as but not limited to computer/machine vision, natural language processing, computer/network security (e.g., detections of ransomware and/or malware), and the like. Each of enhanced neural network trainer 280, enhanced neural network validator 290, and enhanced neural network deployer 292 may employ logic and/or machine instructions 238 stored in storage 230 to carry out and/or implement their associated operations, functionalities, actions, and/or associated methods. It should be noted that storage 230 may include a non-transitory computer-readable media.

FIG. 3A is a block diagram illustrating an exemplary interrelatedness (IR) module 300 in which some embodiments of the present disclosure may be employed. IR module 300 may be similar to, or at least include similar functionalities and/or operations as, IR module 170 of FIG. 1B and/or IR module 270 of FIG. 2B. Various embodiments of IR module 300 are also discussed in conjunction with at least FIGS. 3B and 3C. However, briefly here, IR module 300 may include an interrelated metric component 302, a probability component 304, and a data element (DE) combiner 306. In general, IR module 300 receives an input data element $x\_i$ and "neighboring" input data element $R\_i$. $x\_i$ may be a vector quantity, and $R\_i$ may be a matrix quantity that includes L other input data elements that are "neighboring" to $x\_i$. Thus, as shown in FIG. 3A, $R\_i=\{x\_j1, x\_j2, x\_j3, \ldots, x\_jL\}$, where $j1, j2, j3, \ldots, jL$ are indices that do not include the index i. $R\_i$ may be referred to as a neighboring matrix. Based on the received $x\_i$ and $R\_i$, IR module 300 generates an interrelated data element $r\_i$.

More specifically, interrelated metric component 302 may receive at least one $x\_i$ and/or $R\_i$, and generate an interrelated matrix $M\_i$. $M\_i$ may include column vectors representing an interrelatedness and/or interconnectedness between $x\_i$ and each of the input vectors included in $R\_i$. The interrelatedness and/or interconnectedness between $x\_i$ and $R\_i$ may be based on an association and/or similarity measure. In other embodiments, interrelatedness and/or interconnectedness may be based on an attention. Probability component 304 may generate a probability distribution based on $M\_i$ to generate a normalized interrelated matrix: $\alpha\_i$. That is, probability component 304 may generate a probability distribution for each column vector of $M\_i$, such that the columns of the interrelated normalized matrix, $\alpha\_i$, include a normalized probability distribution of interrelated metrics. In various embodiments, probability component 304 may be enabled to perform a softmax function on $M\_i$. Data element (DE) combiner 306 receives $\alpha\_i$ and $x\_i$ and combines the two data elements (or signals) to generate an interrelated data element $r\_i$. In various embodiments, DE combiner 306 generates $r\_i$ via matrix multiplication.

Turning our attention to FIG. 3B, FIG. 3B provides a block diagram illustrating an association weighted unit (AWU) 310 in which some embodiments of the present disclosure may be employed. AWU 310 may be an embodiment of IR module 170 of FIG. 1B, IR module 270 of FIG.

2B, or IR module 300 of FIG. 3A. AWU 310 may include an association similarity component 312, a softmax component 314, and a data element (DE) combiner 316. Association similarity component 312 may be an embodiment of interrelated metric component 302 of FIG. 3A. Softmax component 314 may be an embodiment of probability component 304 of FIG. 3A. DE combiner 316 may be an embodiment of DE combiner 206 of FIG. 3A.

As shown in FIG. 3B, AWU 310 receives primary input DE $x_i \in \mathbb{R}^n$, where n is the dimensionality of the input vector. AWU 310 also receives a set of other input data elements that are "nearby" or "neighboring" the primary data element: $R_i = \{x_j: i \neq j; x_j \in \mathbb{R}^n\}$. $R_i$ includes L input vectors. At least some input vectors, such as but not limited at least one of $x_i$ and/or $R_i$ may be output vectors from "upstream" (or lower-level) layers of the neural network, such as dense or embedding layers. $R_i$ may be encoded as a matrix, where the neighboring data elements are column vectors. Thus, $R_i$ may be a neighboring matrix. Association similarity component 312 employs an association and/or similarity measure: $\lambda_{AM}$. In some embodiments, the association and/or similarity measure: $\lambda_{AM}$ may be learned instead of using a deterministic function. Deep structured semantic models (DSSM) may be employed in some embodiments. DSSM may be employed to learn the weights of two neural network's lower dense layers which are trained based on the cosine similarity between two input vectors. In a second embodiment, a Siamese neural network may be employed to jointly learn the weights of two neural network's lower dense layers which are trained based on the cosine similarity between two input vectors and where the neural network weights are tied (i.e. the same) for both neural networks. The similarity measure is a function that computes an association and/or similarity metric (e.g., scalar) between the primary input vector and each of the other input vectors included in $R_i$. In some embodiments, $\lambda_{AM}$ may be a cosine similarity between a pair of vectors (e.g., a vector dot product). In other embodiments, $\lambda_{AM}$ may be a pointwise mutual information (PMI) operation between a pair of vectors. These embodiments are not limiting, and any association and/or similarity measure, metric, or operation may be employed for $\lambda_{AM}$. Based on the association measure operations on $x_i$ and $R_i$, association similarity component 312 generates an interrelated matrix: $M_i = [\lambda_{AM}(x_i, x_{j1}), \lambda_{AM}(x_i, x_{j2}), \lambda_{AM}(x_i, x_{j3}), \ldots, \lambda_{AM}(x_i, x_{jL})]$, where $M_i \in \mathbb{R}^{1 \times L}$. Thus, the interrelated matrix encodes the association and/or similarity metrics. Softmax component 314 applies a softmax function to $M_i$ to generate a normalized interrelated matrix: $\alpha_i = \text{softmax}(M_i)$, where $\alpha_i \in \mathbb{R}^{1 \times L}$. DE combiner 316 combines $R_i$ and $\alpha_i$ to generate interrelated data element $r_i$, where $r_i \in \mathbb{R}^n$. More specifically, DE combiner 316 includes a matrix transposer 318 to generate a transpose of $\alpha_i$ and a matrix multiplier 320 to perform a matrix multiplication of $R_i$ and $\alpha_i^T$, i.e., $r_i = R_i \alpha_i^T$. To summarize, the operations of AWU 310 are as follows:

$$R_i = \{x_{j1}, x_{j2}, x_{j3}, \ldots, x_{jL}\} \in j \neq i$$

$$M_i = [\lambda_{AM}(x_i, x^{j1}), \lambda_{AM}(x_i, x_{j2}), \lambda_{AM}(x_i, x_{j3}), \ldots, \lambda_{AM}(x_i, x_{jL})]$$

$$\alpha_i = \text{softmax}(M_i)$$

$$r_i = R_i \alpha_i^T.$$

In various embodiments, the generated interrelated vector may be used alongside the primary input vector, within a neural network with the same set of weights, or with its own dedicated set of weights.

Turning our attention to FIG. 3C, FIG. 3C provides a block diagram illustrating an attended recent inputs (ARI) module 330 in which some embodiments of the present disclosure may be employed. ARI module 330 may be an embodiment of IR module 170 of FIG. 1B, IR module 270 of FIG. 2B, or IR module 300 of FIG. 3A. ARI module 330 may include an attention component 332, a softmax component 334, and a data element (DE) combiner 336. Attention component 332 may be an embodiment of interrelated metric component 302 of FIG. 3A. Softmax component 334 may be an embodiment of probability component 304 of FIG. 3A. DE combiner 336 may be an embodiment of DE combiner 206 of FIG. 3A.

Similar to AWU 310 of FIG. 3B, ARI module 330 receives a set of other input data elements that are "nearby" or "neighboring" a primary data element: $R_i = \{x_j: i \neq j; x_j \in \mathbb{R}^n\}$, where the primary input vector $x_i \in \mathbb{R}^n$, each of $x_j \in \mathbb{R}^n$, and n is the dimensionality of the input vectors. As discussed throughout, the input vectors may be output vectors of other layers of the neural network, such as but not limited to dense or embedding layers. For sequential input data, $R_i$ may include recently processed input data elements. As an example, see R_1-R-6 of FIG. 1B. $R_i$ may be encoded as a matrix, where the neighboring data elements are column vectors. Thus, $R_i$ may be a neighboring matrix. Attention component 332 may include a dense (or fully connected) neural network layer 342. Dense layer 342 may be an attention neural network layer. The attention weights for dense layer 342 are indicated via $W_r$, and may be learned via the training processes discussed herein. Dense layer 342 processes $R_i$ (e.g., $\text{DENSE}(W_r * R_i)$) to generate interrelated matrix: $M_i$, where $M_i \in \mathbb{R}^{1 \times L}$. The interrelated matrix encodes the interrelated metrics (e.g., the attention metrics). Softmax component 334 applies a softmax function to $M_i$ to generate a normalized interrelated matrix: $\alpha_i = \text{softmax}(\omega^T M_i)$, where $\alpha_i \in \mathbb{R}^{1 \times L}$ and $\omega$ is a weighting vector employed to align the attended vector. DE combiner 336 combines $R_i$ and $\alpha_i$ to generate interrelated data element $r_i$, where $r_i \in \mathbb{R}^n$. More specifically, DE combiner 336 includes a matrix transposer 338 to generate a transpose of $\alpha_i$ and a matrix multiplier 340 to perform a matrix multiplication of $R_i$ and $\alpha_i^T$, i.e., $r_i = R_i \alpha_i^T$. To summarize, the operations of ARI module 330 is as follows:

$$R_i = \{x_{j1}, x_{j2}, x_{j3}, \ldots, x_{jL}\} \in j \neq i$$

$$M_i = \text{DENSE}(W_r * R_i)$$

$$\alpha_i = \text{softmax}(\omega^T M_i)$$

$$r_i = R_i \alpha_i^T.$$

Similar to AWU 310, the generated interrelated vector may be used alongside the primary input vector, within a neural network with the same set of weights, or with its own dedicated set of weights.

Figure 4:
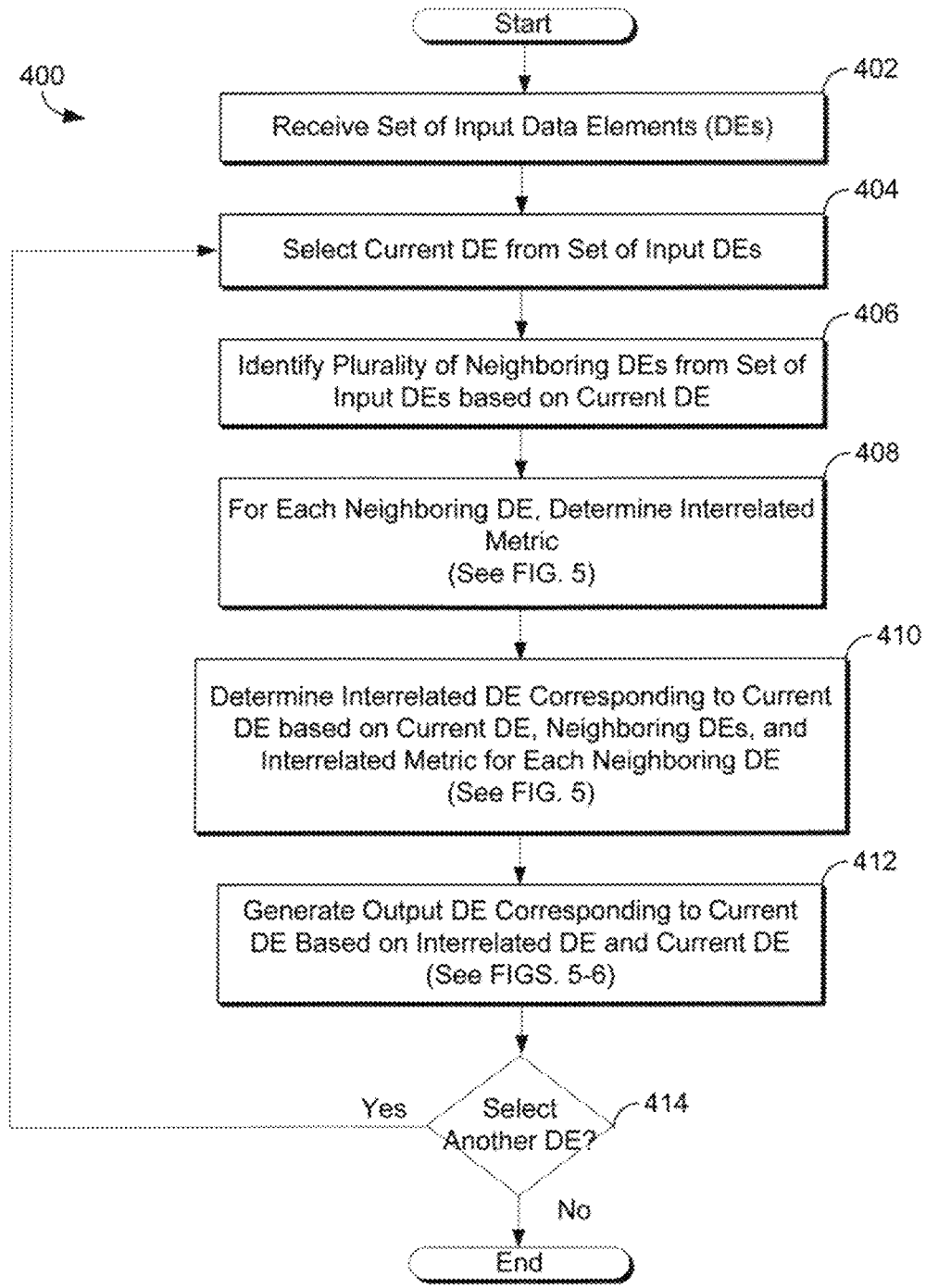
FIG. 4 provides a flow diagram that illustrates a method for implementing an enhanced neural network architecture in accordance with an embodiment of the present disclosure.

Turning now to FIG. 4, a flow diagram is provided that illustrates a method 400 for implementing an enhanced neural network architecture in accordance with an embodiment of the present disclosure. At least portions of method 400 may be enabled by, performed by, and/or carried out by devices and/or components included in operating environment 200 of FIG. 2A and/or enhanced system 220 of FIG. 2B. Process 400 begins, after a start block, at block 402, where a set of input data elements (DEs) are received. The set of input data elements may include input vectors. At block 404, a current DE from the set of input DEs is selected. The selected current DE may be a current input DE and referenced as $x_i$ (or x_i). The selected current DE may be referred to as a primary DE throughout. At block 406, a plurality of neighboring DEs from the set of input DEs is identified based on the current DE. The plurality of neighboring DEs is referenced as set $R_i=\{x_{j1}, x_{j2}, x_{j3}, \ldots, x_{jL}\}$, $\in j \neq i$ (or R_i). At block 408, for each neighboring DE, an interrelated metric is determined. Various embodiments of determining an interrelated metric are discussed in conjunction with at least FIG. 5. However, briefly here, an interrelated metric component, such as but not limited to interrelated metric component 302 of FIG. 3 may determine the interrelated metric for each neighboring DE. The interrelated metric may be an association (or similarity) metric (e.g., $\lambda_{AM}$) (as discussed in conjunction with at least FIG. 3B) or an attention metric (as discussed in conjunction with at least FIG. 3C). At block 408, the interrelated metrics may be encoded in an interrelated matrix (e.g., $M_i$ or M_i). The interrelated matrix may be a normalized interrelated matrix (e.g., $\alpha_i$).

At block 410, an interrelated DE is determined and/or generated. The interrelated DE may be a vector and indicated as $r_i$ (or r_i). Various embodiments of determining and/or generating an interrelated DE are discussed in conjunction with FIG. 5. However, briefly here, an interrelatedness (IR) module, such as but not limited to IR module 170 of FIG. 1A, IR module 270 of FIG. 2B, IR module 300 of FIG. 3A, AWU 310 of FIG. 3B, and/or ARI module 330 of FIG. 3C, may generate the interrelated DE and/or vector $r_i$. The interrelated DE $r_i$ corresponds to the current (or primary) DE $x_i$. At block 412, an output DE, corresponding to the current DE, is generated and/or determined based on the interrelated DE and current DE. Various embodiments for generating an output DE are discussed in conjunction with at least FIGS. 5 and 6. However, briefly here, an enhanced neural network, such as but not limited to enhanced RNN 160 of FIG. 1B and/or enhanced neural network 260 of FIG. 2B may generate an output vector based on a combination of $r_i$ and $x_i$. The output DE corresponding to $x_i$ may be referenced as $h_i$ (or h_i as in FIG. 1B). At decision block 414, it is determined whether to select another input DE as a current DE. If another input DE is to be selected, process 400 returns to block 404. Otherwise, process 400 may terminate.

Figure 5:
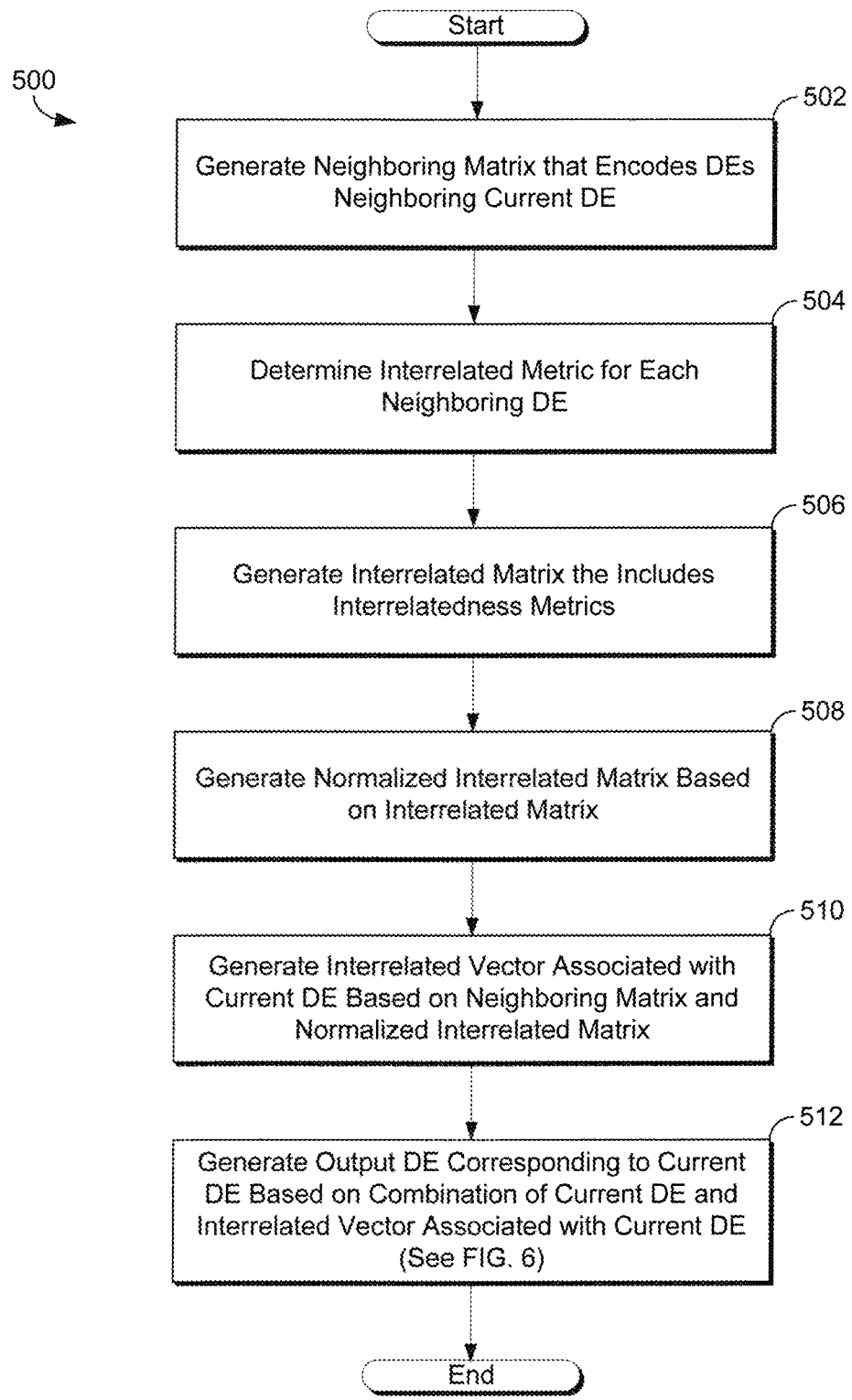
FIG. 5 provides a flow diagram that illustrates a method for implementing an interrelatedness module in accordance with an embodiment of the present disclosure.

FIG. 5 provides a flow diagram that illustrates a method 500 for implementing an interrelatedness (IR) module in accordance with an embodiment of the present disclosure. For example, any of IR module 170 of FIG. 1B, IR module 270 of FIG. 2B, IR module 300 of FIG. 300, AWU 310 of FIG. 3B, and/or ARI module 330 of FIG. 3C may implement and/or perform at least portions of process 500. Process 500 begins, after a start block, at block 502, where a neighboring matrix is generated. The neighboring matrix may encode input data elements that are neighboring the current input data elements (i.e., $x_i$). The neighboring data elements may be encoded as column vectors in the neighboring matrix. The neighboring matrix may be referenced as $R_i=\{x_{j1}, x_{j2}, x_{j3}, \ldots, x_{jL}\}$, $\in j \neq i$, where $R_i \in \mathbb{R}^{n \times L}$, n is the dimenstionality of the current/neighboring input data elements, and L is the integer number of neighboring data elements included in $R_i$. At block 504, an interrelated metric is determined and/or generated for each neighboring data element. For example, an interrelated metric component, such as but not limited to interrelated metric component 302 of FIG. 3A may generate and/or determine the interrelated metrics. In some embodiments, an association similarity component, such as but not limited to association similarity component 312 of FIG. 3B, may generate association and/or similarity interrelated metrics. In other embodiments, an attention component, such as but not limited to attention component 332 of FIG. 3C, may generate attention interrelated metrics. At block 506, an interrelated matrix is generated. The interrelated metric component may encode the interrelated metrics in an interrelated matrix. The interrelated matrix may be referenced as $M_i \in \mathbb{R}^{1 \times L}$.

At block 508, a normalized interrelated matrix is generated based on the interrelated matrix generated at block 506. In various embodiments, a probability component, such as but not limited to probability component 304 of FIG. 3A, may generate the normalized interrelated matrix based on the interrelated matrix generated at block 506. In various embodiments, the probability component may be a softmax component, such as but not limited to softmax component 314 of FIG. 3B and/or softmax component 334 of FIG. 3C. The normalized interrelated matrix may be referenced as $\alpha_1$. At block 510, an interrelated vector is generated and/or determined. The interrelated vector may be based on the normalized interrelated matrix and the neighboring matrix. A data element combiner, such as but not limited to DE combiner 306 of FIG. 3A, DE combiner 316 of FIG. 3B, and/or DE combiner 336 of FIG. 3C, may combine the interrelated matrix and the neighboring matrix to generate the interrelated vector, $r_i$.

At block 512, an output DE that corresponds to the current DE is generated and/or determined. Various embodiments of generating an output DE that corresponds to the current DE are discussed below and in conjunction with at least FIG. 6. However, briefly here, in various embodiments, a combination of the interrelated vector and the current DE (which is also a vector) may be employed to determine the output vector. For example, an enhanced neural network, such as but not limited to enhanced RNN 160 of FIG. 1B and/or enhanced neural network 260 of FIG. 2B, may generate an output vector based on a combination of $r_i$ and $x_i$. The output DE corresponding to $x_i$ may be referenced as $h_i$ (or h_i as in FIG. 1B). The dimensionality of the output DE (or vector) may be referenced as k, such that $h_i \in \mathbb{R}^k$.

In various embodiments, the enhanced neural network that generates the output DE may be a feedback based neural network that sequentially processes sequential input data elements, such as but not limited to a recurrent neural network (RNN), a gated recurrent unit (GRU), or a long short-term memory (LSTM) neural network. For sequential input data, the index t (rather than i) may be employed to represent sequential steps in "time" for sequentially processing the sequential input data elements. For an enhanced RNN, such as but not limited to enhanced RNN 160 of FIG. 1B, the output at time step t (i.e., $h_t$) is based on the output of the previous step (i.e., $h_{t-1}$ is employed as a feedback signal), the current input DE (i.e., $x_t$), and the interrelated data element (or vector) corresponding to $x_t$ (i.e., $r_t$). In at least one embodiment for an enhanced RNN, the enhanced RNN may generate the output data element via the following expression:

$$h_t = \sigma(W_h * h_{t-1} + W_x * x_t + W_r * r_t),$$

where $W_h \in \mathbb{R}^{k \times k}$, $W_x \in \mathbb{R}^{k \times n}$, and $W_r \in \mathbb{R}^{k \times n}$ are trainable weights (e.g., projection matrices) of the enhanced RNN. The function $\sigma(h \in \mathbb{R}^k)$ may be a non-linear function of the neural network, such as but not limited to a sigmoid function, a tan h function, a rectified linear function (or rectified linear unit ReLU), or the like. In some embodiments, $W_h$ and $W_x$ are weights included in a conventional RNN, where $W_x$ are the "interrelated" weights that provide an enhancement to the RNN.

Some classes of enhanced neural networks include internal gates, such as an enhanced gated RNN. In one non-limiting embodiment, an enhanced gated RNN includes a reset gate (γy) and an update gate (z). The enhanced gated RNN may update and/or generate the gate values and the output data element via the following expressions:

$$\gamma = \sigma(W_{h\gamma}*h_{t-1} + W_{x\gamma}*x_t + W_{r\gamma}*r_t)$$

$$z = \sigma(W_{hz}*h_{t-1} + W_{xz}*x_t + W_{rz}*r_t)$$

$$\kappa = \tan h(W_{h\kappa}*(\gamma \odot h_{t-1}) + W_{x\kappa}*x_t + W_{r\kappa}*r_t)$$

$$h_t = (1-z)*\kappa + z*h_{t-1}.$$

Each of $W_{h\gamma}$, $W_{hz}$, $W_{h\kappa} \in \mathbb{R}^{k \times k}$, and $W_{x\gamma}$, $W_{xz}$, $W_{x\kappa}$, $W_{r\gamma}$, $W_{rz}$, $W_{r\kappa} \in \mathbb{R}^{k \times n}$ are projection matrices that encode trainable weights for the enhanced gated RNN.

An enhanced long short-term memory (LSTM) neural network is an extension of an RNN that is advantageous for longer sequences of input data elements. An LSTM has gates for input ($i_t$), output ($o_t$), and forget ($f_t$) data elements, as well as controls ($c_t$) for explicit cell memory and hidden states ($h_t$). The enhanced LSTM neural network may update and/or generate the various gate values, hidden states, and the output data element via the following expressions:

$$i_t = \sigma(W_{hi}*h_{t-1} + W_{xi}*x_t + W_{ri}*r_t)$$

$$f_t = \sigma(W_{hf}*h_{t-1} + W_{xf}*x_t + W_{rf}*r_t)$$

$$o_t = \sigma(W_{ho}*h_{t-1} + W_{xo}*x_t + W_{ro}*r_t)$$

$$c_t = f_t \odot c_{t-1} + i_t \odot \tan h(W_{hc}*(h_{-1}) + W_{xc}*x_t + W_{rc}r_t)$$

$$h_t = o_t \odot \tan h(c_t).$$

where each of the above projection matrices encode trainable weights for the enhanced LSTM neural network.

Figure 6:
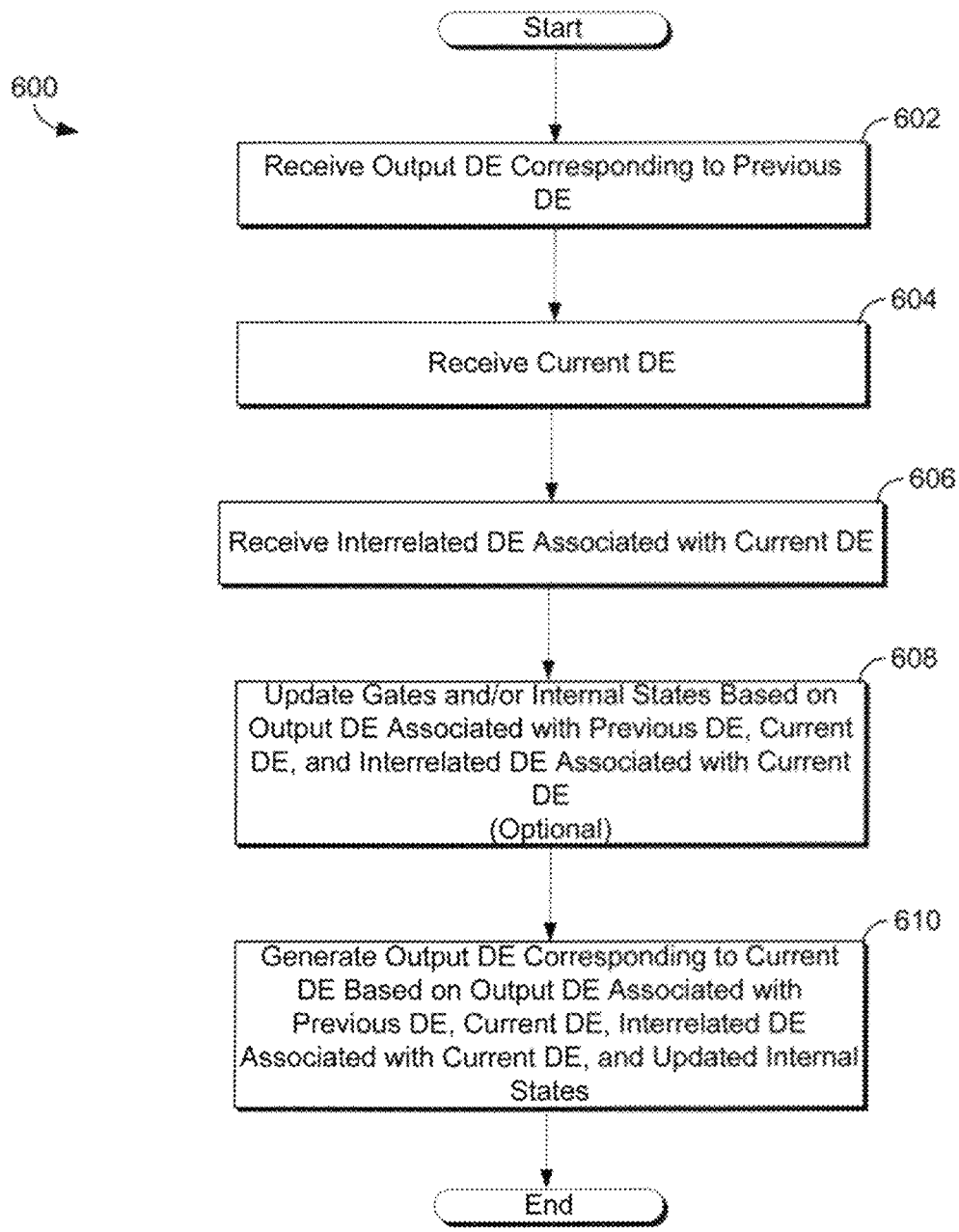
FIG. 6 provides a flow diagram that illustrates a method 600 for employing an enhanced neural network to generate an output data element based on a combination of an input data element and an interrelated data element in accordance with an embodiment of the present disclosure.

FIG. 6 provides a flow diagram that illustrates a method 600 for employing an enhanced neural network to generate an output data element based on a combination of an input data element and an interrelated data element in accordance with an embodiment of the present disclosure. As illustrated in FIG. 6, method 600 is directed towards an enhanced feedback-based neural network, such as but not limited to the enhanced RNN, enhanced gated recurrent unit (GRU), and the enhanced LSTM neural network discussed above. However, other embodiments are not so limited, and method 600 may be readily adapted for other classes of deep neural networks, such as but not limited to convolutional neural networks (CNN).

Method 600 begins, after a start block, at block 602, where an output data element corresponding to a previous input data element is received. For example, $h_{t-1}$ may be received at block 602, where $h_{t-1}$ corresponds to previously processed input data element $x_{t-1}$. The enhanced neural network may employ $h_{t-1}$ as a feedback data element, such as illustrated in at least FIG. 1B. At block 604, the current input data element is received, i.e., the input vector $x_t$ is received. At block 606, the interrelated data element (i.e., $r_t$) is received. In some embodiments, an interrelatedness (IR) module, such as but not limited to IR module 170 of FIG. 1B, IR module 270 of FIG. 2B, IR module 300 of FIG. 3A, AWU 310 of FIG. 3B, and/or ARI module 330 of FIG. 3C may generate and provide $r_t$ as discussed throughout.

At optional block 608, if the enhanced neural network includes any gates and/or hidden/internal state, the values for these gates and/or internal states may be updated or generated. For example, updated gates and internal states of an enhanced gated RNN and an enhanced LSTM neural network are discussed above. At block 610, the output data element corresponding to the current input data element is generated based on the received output data element, the updated values of the gates and internal states, and a combination of the current data element and the interrelated data element. Various embodiments of generating $h_t$ based on $h_{t-1}$, $x_t$, and $r_t$ are discussed throughout. After block 608, method 600 may terminate and/or return to block 602 to continue processing input data.

Some embodiments may employ a self-attention mechanism, a self-association mechanism, and/or a combination of self-attention and self-association. The self-attention and/or self-association may be employed to more effectively "learn" from complex and/or highly interrelated input data. The self-attention/self-association embodiments may be single-headed embodiments or multi-headed embodiments. The employment of multi-headed embodiments enables even more efficient and parallel learning, that are better enabled to learn the interrelatedness of complex input data. In these embodiments, an attention (or association) mechanism may be employed between the current input DE ($x_t$) and each of the neighboring DEs ($R_t$). The attention (or association) mechanism generates an interrelated metric (e.g., an attention score or an association score) for each pairing of the current input DE and the neighboring input DEs. In the embodiments, any of the attention and/or association measures (e.g., cosine similarity, PMI, and the like), discussed herein, may be employed to determine the attention and/or association scores and/or measures. In at least one embodiment, the attention mechanism may include a dot-product between the each pair of vectors. The attention/association score for a pair is employed to weight the mutual significance of the pair.

In the multi-headed embodiments, the input vectors are projected onto n subspaces of the vector space of the input vectors, where n is the number of heads (e.g., the number of subspaces that the larger vector space is partitioned into) and is a positive integer. The input vectors are projected onto the n subspaces, to generate n lower dimension vectors (e.g., sub-vectors) for each input vector. A self-attention/association score is determined in each subspace for each pair of input sub-vectors. The self-attention/association scores are employed to generate n lower dimensional sub-vectors that are indicative of the self-attention/association of each head. The n lower dimensional self-interrelated lower dimensional vectors are combined and/or concatenated to generate a self-attention/association vector. The self-attention/association vector may be employed as an interrelated vector, as discussed herein. In multi-head embodiments, some of the heads may employ a self-association mechanism, and other heads may employ a self-association mechanism. Any combination of self-attention heads and self-association heads may be employed. Any of the IR modules discussed herein may be adapted to generate a self-interrelated vector that indicates a self-attention and/or self-association of the input data. More particularly, $$R_t = \{x_j : j \neq t\}$$

$$X_t = [x_t] \times \text{len}(R_t)$$

$$\text{Self-Attention}(x_t, R_t) = R_t \cdot \text{softmax}([(x_j \cdot x_t), \forall x_j \in R_t])$$

$$\text{Self-Association}(x_t, R_t) = R_t \cdot \text{softmax}([\lambda_{AM}(x_t, x_j), \forall x_j \in R_t])$$

$$\text{Multihead}(x_t, R_t) = \text{Concat}(\text{head}_1, \text{head}_2, \text{head}_3, \ldots, \text{head}_n) \cdot W_O, \text{ and}$$

$$\text{head}_i = \text{Self-Attention}(x_t * W_{xi}, R_t * W_{Ri}).$$

$x_t$ is the current input DE, $X_t$ is an expanded matrix formed by replicating $x_t$, L=len($R_t$) times, such that $X_t$ is a matrix that include L column vectors of $x_t$. Each of the n heads may generate one of the self-attention or self-association calculations, where $(x_j \cdot x_t)$ indicates a vector dot product and $\lambda_{AM}(x_t, x_j)$ indicates an association and/or similarity measure, as discussed throughout. The softmax function is employed to generate a probability distribution from the self-attention and/or self-association operations. head$_i$ are represented by lower-dimensional sub-vectors. $W_{xi}$ and $W_{Ri}$ are trainable self-attention or self-association projection matrixes. $W_O$ is a projection matrix r projection the lower-dimensional to sub-vectors into the vector space of the input vectors. Note that some heads may employ the self-attention mechanism, while other heads may employ the self-association mechanism.

In an example embodiment, self-association may be employed to perform language translation, via an enhanced Neural Machine Translation (NMT) method. The input vectors may indicate an input sentence, such as indicated in FIG. 1B. When performing the language translation, each word's association with each of the other words in the sentence may be determined via the self-association method discussed above. Such self-attention and/or self-association methods may be employed in other applications, such as but not limited to input data that forms a graph.

Association and/or attention may be employed to train multiple models. In one embodiment, a supervised or unsupervised first model is initially trained for a first objective with a training data set. The trained first model is employed to generate vector embeddings or representations of input data elements via the first objective. The trained first model is also employed to generate and/or determine the interrelatedness (via association and/or attention) of the inputs. The vector representations and interrelatedness of the inputs are used to train a second model for a second objective, where the second model accepts the same, or at least similar, inputs to the first model. Thus, the interrelatedness of the inputs, learned via the first model, may be employed to train the second model. The interrelatedness of inputs that is learned for one objective can be employed when training another model for another objective. That is, once determined, the interrelatedness of inputs may be recycles for additional models for additional objectives.

In one embodiment of multi-model training includes training a Neural Machine Translation (NMT) enhanced system. Separate language models (i.e., English and German models) are trained. Such training generates word vector representations for words in each language. When training a translation model, association between the inputs of each model may be learned. That is, association between English words and German words may be determined via the embodiments discussed herein. Thus, the language-model-trained vector embeddings may be enhanced via association and/or attention. Thus smaller models (e.g., an English language model and a German language model), with specific objectives (e.g., an English-only objective or a German-only objective) learned from separate training data sets may be merged, via interrelatedness, into a larger language translating model with a larger objective (e.g., translating between English and German).

In other embodiments, the interrelatedness of inputs, as discussed herein, is employed to enhance differential privacy applications. In general, differential privacy refers to methods that makes portions of information available (i.e., data) to others without compromising the privacy of other sensitive portions of the data. For example, a differentially private machine learning method may include providing learned model parameters to the public, such that the public may deploy the trained model, in a manner such that information regarding the model's training data set cannot be inferred and/or reverse engineered. For example, to obfuscate information about the underlying training data, noise may be added to a model's weight prior to providing the model's weights to others. Such conventional methods for differential privacy may lead to sub-optimally performing (i.e., noisy) public models and/or require unacceptably long training time.

In the enhanced embodiments herein, association may be employed to reduce training times and increase the performance of the models to be released to others, such that a party can keep their sensitive training data secret, while still providing useful models to others. The learned interrelatedness of the inputs may be employed to determine close approximations of the fully optimized model. The close approximation model (and not the fully optimized model) is provided may be provided to the public. In contrast to providing the fully optimized model, the public may not infer or reverse engineer secrets encoded in the training data from the weights of the close approximation model.

In at least one embodiment, association measures may be employed to partially train a model. Such model parameters (or eights) encode partial information about the corresponding training data, as well as statically derived scalars, which can serve as the noise component to obfuscate the information about the training data. These embodiments may selectively employ the learned association measures specific to train data and the model's objective. The static parameters encode information beyond random noise in the training data. The static parameters are made available to the public, and the static parameter cannot be employed to recover information about the training data.

Figure 7:
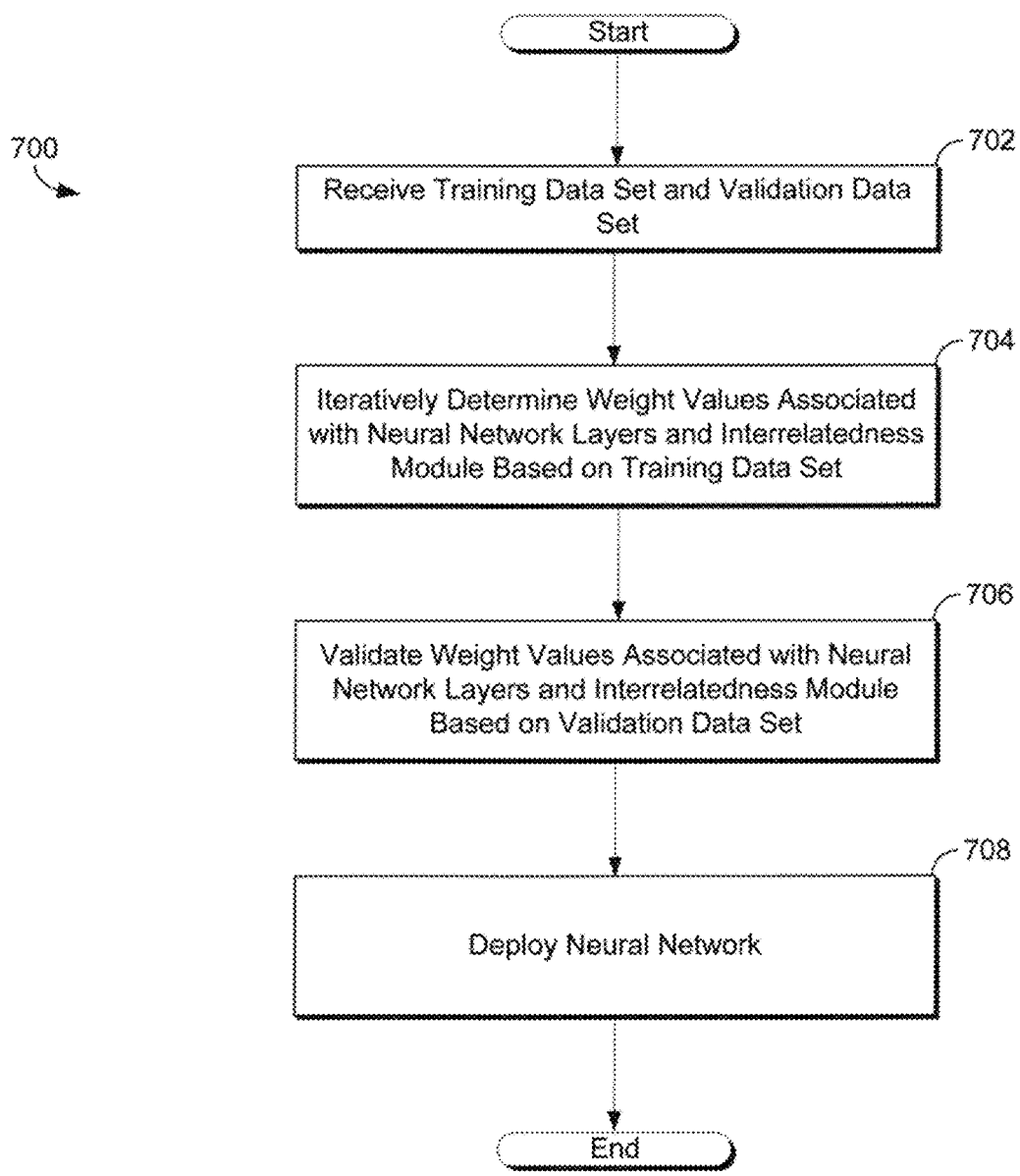
FIG. 7 provides a flow diagram that illustrates a method for training an enhanced neural network architecture that is in accordance with an embodiment of the present disclosure.

FIG. 7 provides a flow diagram that illustrates a method 700 for training an enhanced neural network architecture that is in accordance with an embodiment of the present disclosure. Method 700 may be employed to train any of the various enhanced neural networks and/or enhanced neural network architectures discussed herein, including but not limited to enhanced RNN 160 of FIG. 1B and enhanced neural network architecture 250 of FIG. 2B. Method 700 may be employed to train any of the interrelatedness (IR) modules discussed herein, including but not limited to IR module 170 of FIG. 1B, IR module 270 of FIG. 2B, IR module 300 of FIG. 3A, AWU 310 of FIG. 3B, and/or ARI module 330 of FIG. 3C.

Method 700 begins, after a start block, at block 702 where training data and validation data are received. For example, training data 232 and validation data 234 may be received and/or accessed from storage 230 of FIG. 2B. At block 704, values for the weights of the enhanced neural network and the IR module are iteratively updated based on the training data. That is, the neural network and IR module are trained at block 704. For example, a neural network trainer, such as but not limited to neural network trainer 280 of FIG. 2B, may be employed to iteratively train enhanced neural network 260 and IR module 270 via the training data. At block 706, the trained enhanced neural network architecture is validated based the validation data. An enhanced neural network validator, such as but not limited to enhanced neural network validator 290 of FIG. 2B may be employed to validated the training of enhanced neural network 260 and IR module 270. At block 708, the trained and validated enhanced neural network architecture is deployed. In various embodiments, an enhanced neural network deployer, such as but not limited to enhanced neural network deployer 292 of FIG. 2B, may deploy the trained and validated enhanced neural network architecture into any of the various applications that a neural network may be deployed. Method 700 may terminate after block 708.

Figure 8A:
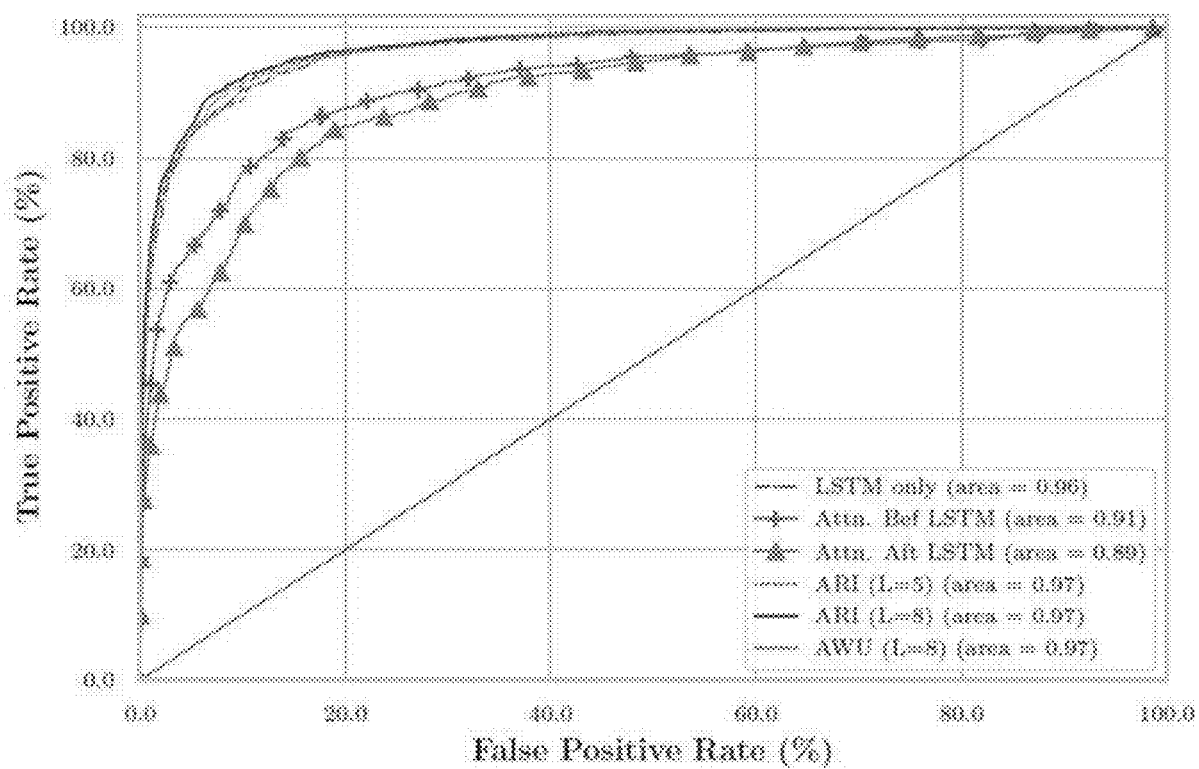
FIGS. 8A-8B illustrate experimental data that indicate various improvements in performance of an enhanced neural network that is enabled to determine and employ the interrelatedness of the input data.
Figure 8B:
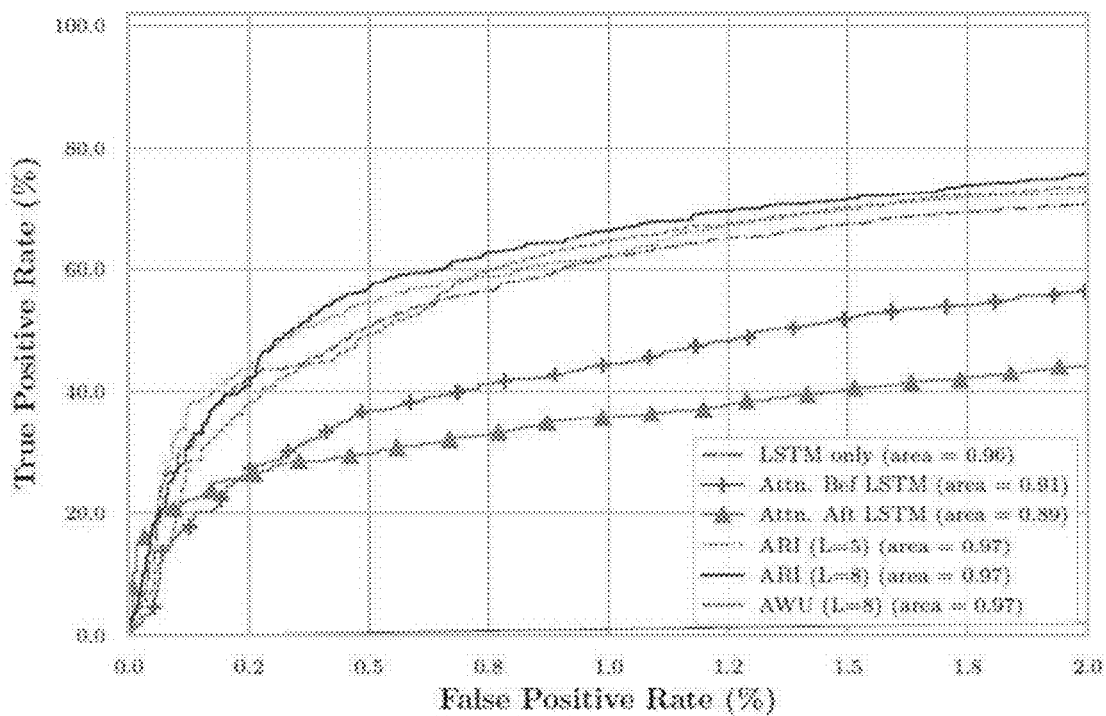

FIGS. 8A-8B illustrate experimental data that indicate various improvements in performance of an enhanced neural network that is enabled to determine and employ the interrelatedness of the input data. In FIGS. 8A-8B, classifier (such as but not limited to a binary classifier) conventional and enhanced neural networks are trained and employed to sequentially process sequential computer security data. The neural networks classify the data as either being associated with "ransomware" (or other types of "malware") or associated with benign computer operations. The input data includes sequences of executable events that are either ransomware (or other malware such as but not limited to cryptocoin mining malware or side-channel attack malware) generated events or events generated by benign applications. By employing the enhanced neural network architecture that employs the interrelatedness of the input data as discussed throughout, the various embodiments may detect malware (such as but not limited to ransomware) earlier than conventional methods. The detected malware may be isolated, neutralized, or removed prior to causing damage to the infected computer and/or network system. FIGS. 8A-8B show the differences between the performance of the conventional neural networks and the enhanced neural networks. In various embodiments, the detected malware may be cryptocoin (e.g., Bitcoin or other distributed-ledger type applications) mining malware or side-channel attack malware. To detect malware regarding side-channel attacks or cryptocoin mining, "hardware" counters (which may be the events in the sequenced input data) may be used in conjunction with "software" events in the processing. That is, either software events, hardware events, or a combination thereof, may be employed to detect malware. As noted throughout, such computer and/or network security application may be employed to distinguish between signals generated by "benign" software and signals generated by malware. Upon detection of such malware generated signals or events, the malware may be isolated, removed, or otherwise neutralized prior to harm to the computer and/or network system.

More specifically, FIGS. 8A-8B show receiver operating characteristic (ROC) curves for a conventional LSTM neural network, attention before LSTM network, attention after LSTM, an enhanced LSTM employing attention-based interrelatedness (ARI-LSTM), and an enhanced LSTM employing association-based interrelatedness (AWU-LSTM). For the enhanced ARI-LSTM model, L (the number of interrelated neighboring input data elements) was varied from L=5 to L=8. For the enhanced AWU-LSTM model, L=8. FIG. 8B includes a "zoomed" in view of FIG. 8A, where the false positive rate (x-axis) is limited between 0% and 2%. As shown in the ROC curves, the enhanced models include a larger true positive rate for a given false positive rate, as compared to the conventional models.

Figure 9:
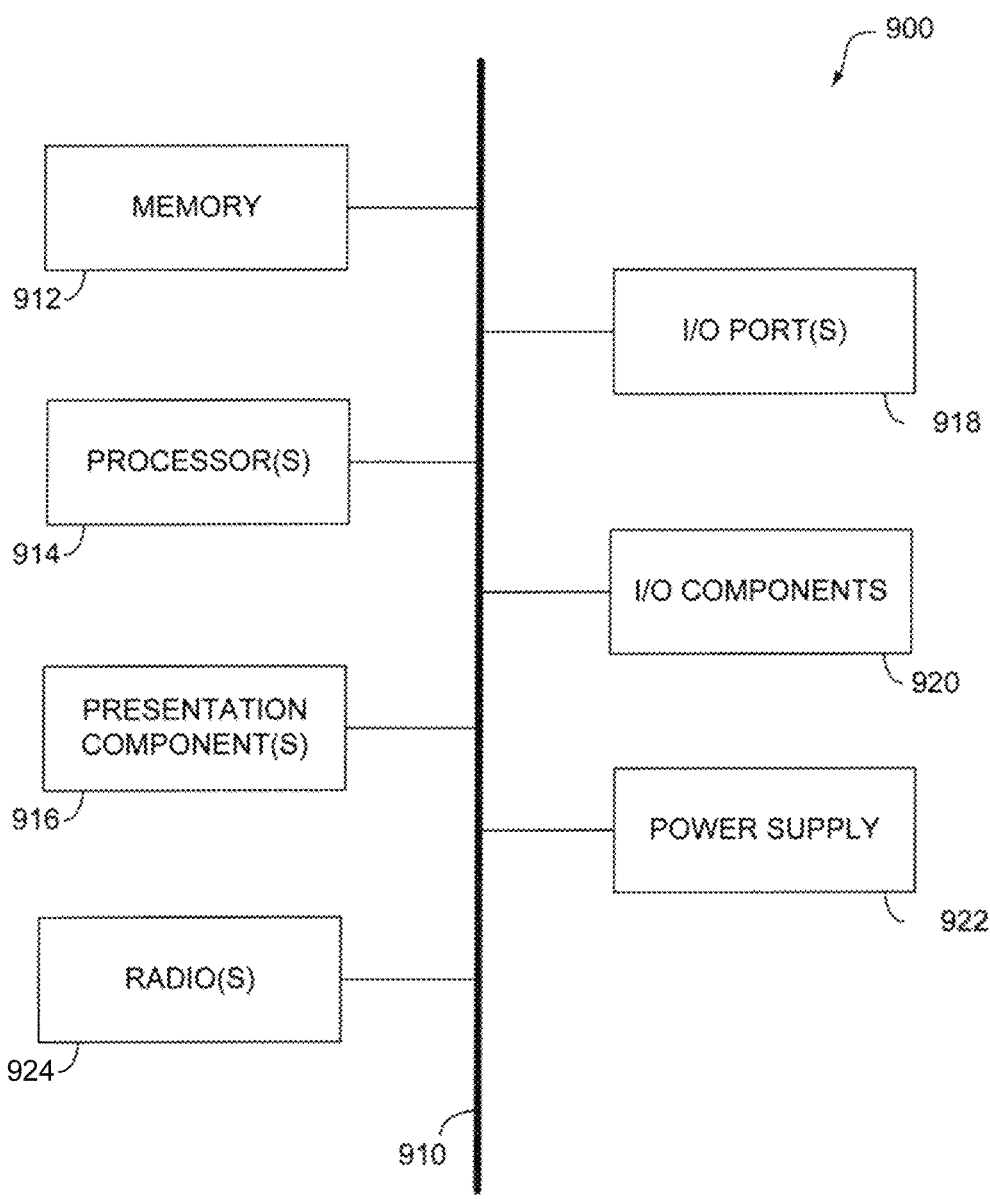
FIG. 9 is a block diagram of an exemplary computing environment suitable for use in implementing an embodiment of the present disclosure.

Having described various implementations, an exemplary computing environment suitable for implementing embodiments of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, processor 914, presentation component 916, input/output (I/O) port 918, I/O component 920, and an illustrative power supply 922. Bus 910 represents what may be a bus (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes processor 914 that read data from various entities such as memory 912 or I/O components 920. Presentation component(s) 916 presents data indications to a user or other device. Other examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system for identifying a computer security event, the system comprising:
    a processor; and
    computer storage memory having computer-executable instructions stored thereon which, when executed by the processor, implement a method comprising:
    receiving a first input vector, a second input vector, and a third input vector for a neural network that includes an enhanced architecture, wherein the first, second, and third input vectors sequentially encode a plurality of sequential computing device operations;
    based on a first cosine similarity operation on the first and second input vectors, determining a first interrelated metric that indicates a degree of interrelatedness between the first input vector and the second input vector;
    based on a second cosine similarity operation on the first and third input vectors, determining a second interrelated metric that indicates a degree of interrelatedness between the first input vector and the third input vector;
    generating an interrelated vector based on the first interrelated metric and the second interrelated metric; and
    employing the processor to utilize the enhanced architecture of the neural network to generate a first output vector that corresponds to the first input vector and is based on a combination of the first input vector and the interrelated vector, wherein the first output vector indicates the computer security event.

2. The system of claim 1, wherein determining the first interrelated metric is based on a first attention operation on the second input vector and determining the second interrelated metric is based on a second attention operation on the third input vector.

3. The system of claim 1, wherein the method further comprises:
    generating a first matrix based on the second and third input vectors;
    generating a second matrix based on a first matrix operation on the first matrix, wherein the first matrix operation determines the first and the second interrelated metrics and the first and second interrelated metrics are encoded as separate vectors in the second matrix; and
    generating the interrelated vector based on a second matrix operation on the second matrix.

4. The system of claim 1, wherein the neural network is a recurrent neural network (RNN) and the method further comprises:
    employing the RNN to generate a third output vector that corresponds to the third input vector;
    employing the RNN to generate a second output vector that corresponds to the second input vector and based on the third output vector and a combination of the second input vector and a second interrelated vector, wherein the second interrelated vector indicates a degree of interrelatedness between the second input vector and the third input vector; and
    employing the RNN to generate the first output vector that corresponds to the first input vector further and is further based on the second output vector that corresponds to the second input vector.

5. The system of claim 1, wherein the computer security event is associated with an instance of ransomware and the neural network is enabled to identify the instance of ransomware based on sequentially generating a plurality of output vectors associated with the first, second, and third input vectors.

6. The system of claim 1, wherein the first and second interrelated metrics are multi-head self-interrelated metrics.

7. A method for implementing a neural network on a computing device having a processor, wherein the neural network includes an enhanced architecture and the method comprises:
    receiving a first input vector, a second input vector, and a third input vector for the neural network;
    based on a first cosine similarity operation on the first and second input vectors, determining a first interrelated metric that indicates a degree of interrelatedness between the first input vector and the second input vector;
    based on a second cosine similarity operation on the first and third input vectors, determining a second interrelated metric that indicates a degree of interrelatedness between the first input vector and the third input vector;
    generating an interrelated vector based on the first interrelated metric and the second interrelated metric; and
    employing the processor to utilize the enhanced architecture of the neural network to generate a first output vector that corresponds to the first input vector and is based on a combination of the first input vector and the interrelated vector.

8. The method of claim 7, wherein determining the first interrelated metric is based on a first attention operation on the second input vector and determining the second interrelated metric is based on a second attention operation on the third input vector.

9. The method of claim 7, further comprising:
    generating a first matrix based on the second and third input vectors;
    generating a second matrix based on a first matrix operation on the first matrix, wherein the first matrix operation determines the first and the second interrelated metrics and the first and second interrelated metrics are encoded as separate vectors in the second matric; and
    generating the interrelated vector based on a second matrix operation on the second matrix.

10. The method of claim 7, wherein the neural network is a recurrent neural network (RNN) and the method further comprises:
    employing the RNN to generate a third output vector that corresponds to the third input vector;
    employing the RNN to generate a second output vector that corresponds to the second input vector and based on the third output vector and a combination of the second input vector and a second interrelated vector, wherein the second interrelated vector indicates a degree of interrelatedness between the second input vector and the third input vector; and
    employing the RNN to generate the first output vector that corresponds to the first input vector further and is further based on the second output vector that corresponds to the second input vector.

11. The method of claim 7, wherein the first, second, and third input vectors sequentially encode a plurality of sequential computing device operations and the neural network is enabled to identify a computer security event associated with the plurality of sequential computing device operations based on sequentially generating a plurality of output vectors associated with the first, second, and third input vectors.

12. The method of claim 7, wherein the neural network is a convolutional neural network (CNN), the first input vector encodes a first portion of an image, the second input vector encodes a second portion of the image, and the third input vector encodes a third portion of the image.

13. A non-transitory computer-readable media having instructions stored thereon, wherein the instructions, when executed by a processor of a computing device, cause the computing device to implement a neural network, includes an enhanced architecture, by performing actions including:
    receiving a first input data element (DE), a second input DE, and a third input DE for the neural network;
    based on a first cosine similarity operation on the first and second input DEs, determining a first interrelated metric that indicates a degree of interrelatedness between the first input DE and the second input DE;
    based on a second cosine similarity operation on the first and third input DEs, determining a second interrelated metric that indicates a degree of interrelatedness between the first input DE and the third input DE;
    generating an interrelated DE based on the first interrelated metric and the second interrelated metric; and
    employing the processor to utilize the enhanced architecture of the neural network to generate a first output DE that corresponds to the first input DE and is based on a combination of the first input DE and the interrelated DE.

14. The computer-readable media of claim 13, wherein determining the first interrelated metric is based on a first attention operation on the second input DE and determining the second interrelated metric is based on a second attention operation on the third input DE.

15. The computer-readable media of claim 13, the actions further comprising:
    generating a first matrix based on the second and third input DEs;
    generating a second matrix based on a first matrix operation on the first matrix, wherein the first matrix operation determines the first and the second interrelated metrics and the first and second interrelated metrics are encoded as separate DEs in the second matric; and
    generating the interrelated DE based on a second matrix operation on the second matrix.

16. The computer-readable media of claim 13, wherein the neural network is a recurrent neural network (RNN) and the actions further comprise:
    employing the RNN to generate a third output DE that corresponds to the third input DE;

employing the RNN to generate a second output DE that corresponds to the second input DE and based on the third output DE and a combination of the second input DE and a second interrelated DE, wherein the second interrelated DE indicates a degree of interrelatedness between the second input DE and the third input DE; and employing the RNN to generate the first output DE that corresponds to the first input DE further and is further based on the second output DE that corresponds to the second input DE.

17. The computer-readable media of claim 13, wherein the first, second, and third input DEs sequentially encode a plurality of sequential computing device operations and the neural network is enabled to identify a computer security event associated with the plurality of sequential computing device operations based on sequentially generating a plurality of output DEs associated with the first, second, and third input DEs.

* * * * *